(12) United States Patent
Hoberg et al.

(10) Patent No.: US 12,251,666 B2
(45) Date of Patent: Mar. 18, 2025

(54) IMIDAZOLE COVALENT ORGANIC FRAMEWORK

(71) Applicant: UNIVERSITY OF WYOMING, Laramie, WY (US)

(72) Inventors: John Hoberg, Laramie, WY (US);
Bruce Parkinson, Laramie, WY (US);
Valerie Kuehl, Laramie, WY (US);
Deana Sadrieva, Laramie, WY (US)

(73) Assignee: UNIVERSITY OF WYOMING, Laramie, WY (US)

( * ) Notice: Subject to any disclaimer, the term of this patent is extended or adjusted under 35 U.S.C. 154(b) by 12 days.

(21) Appl. No.: 17/591,692

(22) Filed: Feb. 3, 2022

(65) Prior Publication Data

US 2022/0241734 A1    Aug. 4, 2022

Related U.S. Application Data

(60) Provisional application No. 63/145,093, filed on Feb. 3, 2021.

(51) Int. Cl.
*B01D 67/00* (2006.01)
*B01D 69/02* (2006.01)
*B01D 69/12* (2006.01)
*B01D 71/02* (2006.01)

(52) U.S. Cl.
CPC ... *B01D 67/0079* (2013.01); *B01D 67/00791* (2022.08); *B01D 69/02* (2013.01); *B01D 69/12* (2013.01); *B01D 71/025* (2013.01); B01D 2323/10 (2013.01); B01D 2325/02832 (2022.08); B01D 2325/20 (2013.01); B01D 2325/36 (2013.01); B01D 2325/38 (2013.01)

(58) Field of Classification Search
None
See application file for complete search history.

(56) References Cited

U.S. PATENT DOCUMENTS 8,907,102 B2    12/2014    Weston et al.

OTHER PUBLICATIONS

A Highly Ordered Nanoporous, Two-Dimensional Covalent Organic Framework with Modifiable Pores, and Its Application in Water Purification and Ion Sieving, Valerie A. Kuehl, et al., Journal of the American Chemical Society 2018 140 (51), 18200-18207 (Year: 2018).*

Crystalline Lithium Imidazolate Covalent Organic Frameworks with High Li-Ion Conductivity, Yiming Hu, et al., Journal of the American Chemical Society 2019 141 (18), 7518-7525 (Year: 2019).*

(Continued)

*Primary Examiner* — Jason M Greene
*Assistant Examiner* — Eric J McCullough
(74) *Attorney, Agent, or Firm* — Patterson + Sheridan, LLP

(57) ABSTRACT

A composition of matter including a two-dimensional covalent organic imidazole framework (COF) polymer having an aromatic backbone and ordered nanometer sized pores that may be functionalized with a variety of functional groups. A filtration membrane having both high throughput and highly selective transport or rejection of a species of interest based on size, charge or other molecular properties is readily formed of the two-dimensional COF polymer. The filtration membrane being formed by providing a substrate, such as anodic aluminum oxide (AAO), and then depositing exfoliated carboxyl COF onto the substrate.

20 Claims, 21 Drawing Sheets

(56) References Cited

OTHER PUBLICATIONS

Yang, H.-C., Xie, Y., Hou, J., Cheetham, A. K., Chen, V., Darling, S. B., Adv. Mater. 2018, 30, 1801495. (Year: 2018).*

In-Depth Experimental and Computational Investigations for Remarkable Gas/Vapor Sorption, Selectivity, and Affinity by a Porous Nitrogen-Rich Covalent Organic Framework, Prasenjit Das and Sanjay K. Mandal, Chemistry of Materials 2019 31 (5), 1584-1596 (Year: 2019).*

Constructing Robust Covalent Organic Frameworks via Multicomponent Reactions, Peng-Lai Wang, et al., Journal of the American Chemical Society 2019 141 (45), 18004-18008 (Year: 2019).*

Pyrimidazole-Based Covalent Organic Frameworks: Integrating Functionality and Ultrastability via Isocyanide Chemistry, Jiao Liu, et al., Journal of the American Chemical Society 2020 142 (50), 20956-20961 (Year: 2020).*

Constructing Crystalline Covalent Organic Frameworks from Chiral Building Blocks, Hai-Sen Xu, et al., Journal of the American Chemical Society 2016 138 (36), 11489-11492 (Year: 2016).*

\* cited by examiner

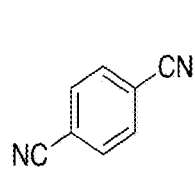 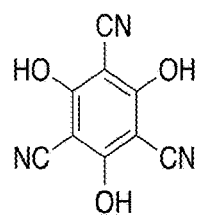 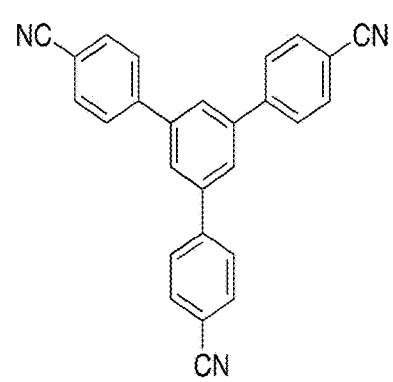 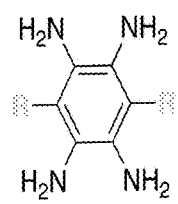
FIG. 3A    FIG. 3B    FIG. 3C    FIG. 3D
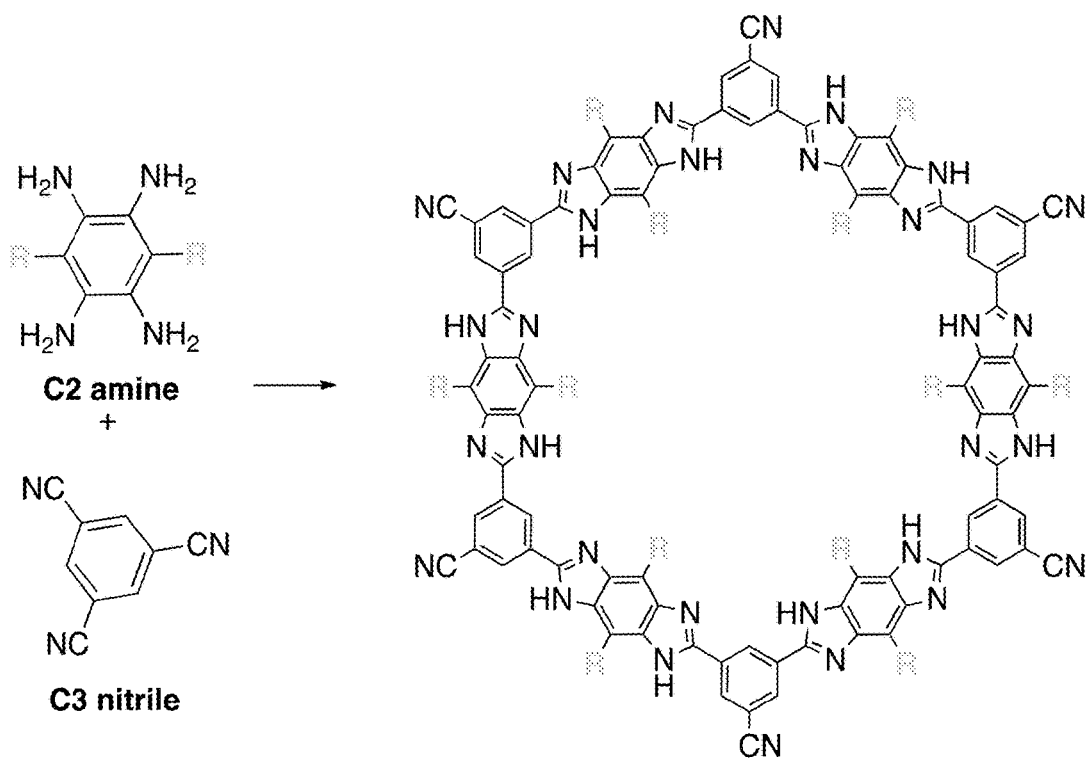
FIG. 4A Water Methanol

DMF

Ethanol

POSITIVE Charged
pH = <4

NEGATIVE Charged
pH = >11

IMIDAZOLE COVALENT ORGANIC FRAMEWORK

CROSS REFERENCE TO RELATED APPLICATION

This application claims priority benefit of U.S. Provisional Patent Application No. 63/145,093 filed on Feb. 3, 2021, which is incorporated herein by reference.

FIELD OF THE INVENTION

The present invention in general relates to filtration membranes and in particular to nanoporous polymeric material membranes with high filtration selectivity and paradoxically high permeance.

BACKGROUND OF THE INVENTION

The past decade has seen an explosion of interest in two-dimensional (2D) materials that started with the demonstration of the extraordinary properties of graphene, and has been extended to other 2D materials, such as transition metal dichalcogenides, nanoplatelets and other elemental 2D phases (germanene, silicene, etc.).[1] The promise of 2D materials is largely based on their unique single-layer electrical, optical, and magnetic properties. However, current 2D materials are not easily modified to suit a given application: that is, there is very little flexibility in adjusting the materials performance beyond their intrinsic properties. This rigidity and lack of adaptability presents significant barriers to technological implementation and broad use. Attempts have been made to achieve this goal by modifying graphene. For example, a top down approach using ion bombardment,[2] etching,[3] or oxidations,[4] produces graphene oxide (GO) with pores containing a high degree of polydispersity in both size and density. These randomly produced pores start to overlap when produced at high density producing both larger openings and weakening the material. In fact, variations in the degree of oxidation caused by differences in starting materials (principally the graphite source) or oxidation protocol can cause substantial variation in the structure and properties of the material.[5] As a result, permeation (flux) through GO membranes remains insufficient to technically compete with current commercial pressure-driven membranes.[6] This challenging task of creating atomically precise nanopores, without destroying the material itself, has thus remained elusive. However, just recently a bottom-up synthesis of a nanoporous "graphene" was reported.[7] providing a material with ordered nanopores while maintaining the integrity of the graphene. Although this bottom-up strategy proved to be successful in the monolayer regime, the nine-step synthesis provides only nanogram quantities and did not produce a material capable of pore functionalization. Metal organic framework materials have also been investigated for membrane production however they suffer from their 3D structures where membranes have to be fabricated with grains of these materials where species can diffuse in the spaces between grains rather than through the porous structure. A 2D material can naturally produce a membrane without this possibility via the natural stacking of the 2D grains as in graphene oxide where the size selection has actually been attributed to the tortuous diffusion path between the layers. These ordered and completely engineered pores might have great efficacy across multiple applications, including high performance separations.

Separations are fundamental to life processes, analytical protocols, industrial processes and consumes greater than 10% of world energy use.[10] Many of the conventional separation techniques, such as distillation, extraction and chromatographies, are both time and energy intensive. In addition, ion or gas permeable membranes are vital to the operation of virtually all electrochemical devices including batteries, fuel cells, electrolyzers and desalinization systems. Additionally, it is well known in the art that the relationship of throughput and selectivity of a filter is generally inversely proportional.

Accordingly, there exists a need for a membrane for separations that has both high throughput and highly selective transport or rejection of the species of interest based on size, charge or other molecular properties.

SUMMARY OF THE INVENTION

The present invention provides a composition of matter including a two-dimensional covalent organic imidazole framework (COF) polymer having an aromatic backbone and ordered nanometer sized pores. The COF configured to be functionalized with a variety of functional groups. The present invention additionally provides a filtration membrane formed of the two-dimensional COF polymer. The filtration membrane having both high throughput and highly selective transport or rejection of a species of interest based on size, charge or other molecular properties. The present invention additionally provides a method of forming the filtration membrane that includes providing a substrate, such as anodic aluminum oxide (AAO), and then depositing exfoliated carboxyl COF onto the substrate. According to embodiments, the method additionally includes applying exfoliated tertiary amine COF and exfoliated carboxyl COF in alternating layers as a stack on the AAO substrate.

BRIEF DESCRIPTION OF THE DRAWINGS

The present invention is further detailed with respect to the following drawings. These figures are not intended to limit the scope of the present invention but rather illustrate certain attributes thereof.

FIGS. 3A-3D illustrate monomers of nitriles and diamines that may illustratively be used as building blocks for assembly of COFs from C3 and C2 symmetry groups in embodiments of the invention;

FIGS. 4A-4D illustrate a single resultant pore of COFs from C3 and C2 symmetry groups in accordance with embodiments of the invention;

FIG. 7A is a zwitterion form, FIG. 7B is a positively charged pore, and FIG. 7C is a negatively charged pore in accordance with embodiments of the invention;

DETAILED DESCRIPTION OF THE INVENTION

The present invention provides filtration membranes with high filtration selectivity based on specific chemical properties such as size and charge while also affording high permeance. The membranes of the present disclosure are attractive separators due to their small energy requirements and their potential for both fast and selective separations. Membranes according to embodiments of the present disclosure have atomic scale capillaries that efficiently allow the separation of the species from solutions and suspensions based on properties depending on the molecular and ionic size.[11] According to some inventive embodiments, a membrane is fabricated from A covalent organic framework (COF). As a result, solvent permeance values of more than 900 $Lm^{-2}$ $h^{-1}$ $bar^{-1}$ are achieved and in some inventive embodiments, values of between 900 and 6000 $Lm^{-2}$ $h^{-1}$ $bar^{-1}$ are achieved. In concert with the permanence values obtained through use of an inventive filter, filtered species rejection percentages are achieved that are greater than 60% and in some inventive embodiments between 60 and 95% per single membrane pass.

Imidazole is an organic compound with the formula $C_3N_2H_4$. Imidazole is a white or colourless solid that is soluble in water, producing a mildly alkaline solution. In chemistry, it is an aromatic heterocycle, classified as a diazole, and has non-adjacent nitrogen atoms.

The present invention provides a novel class of two-dimensional covalent organic imidazole framework (COF) polymers that have a highly stable, photoactive, semiconducting aromatic backbone with intrinsically and exactly ordered nanometer sized pores, and, unlike other COFs,[8,9] can be functionalized with a variety of functional groups.

Figure 1A:
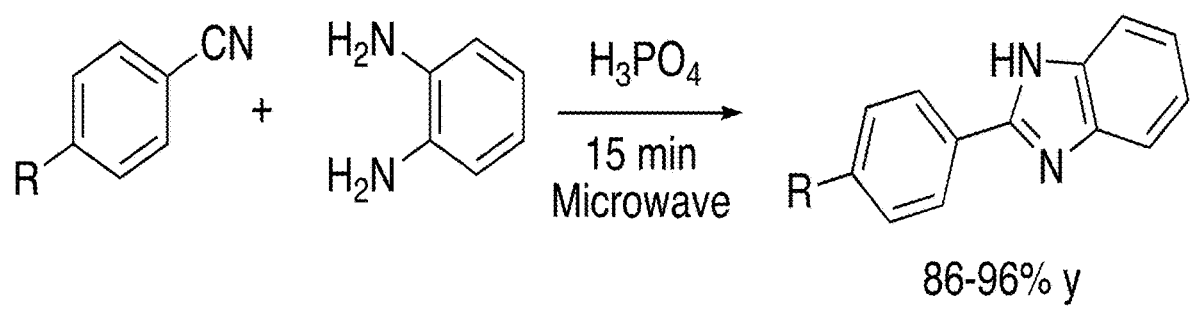
FIG. 1A is a prior art reaction for formation of imidazoles by reaction of diamines with nitriles using microwave reactions.
Figure 1B:
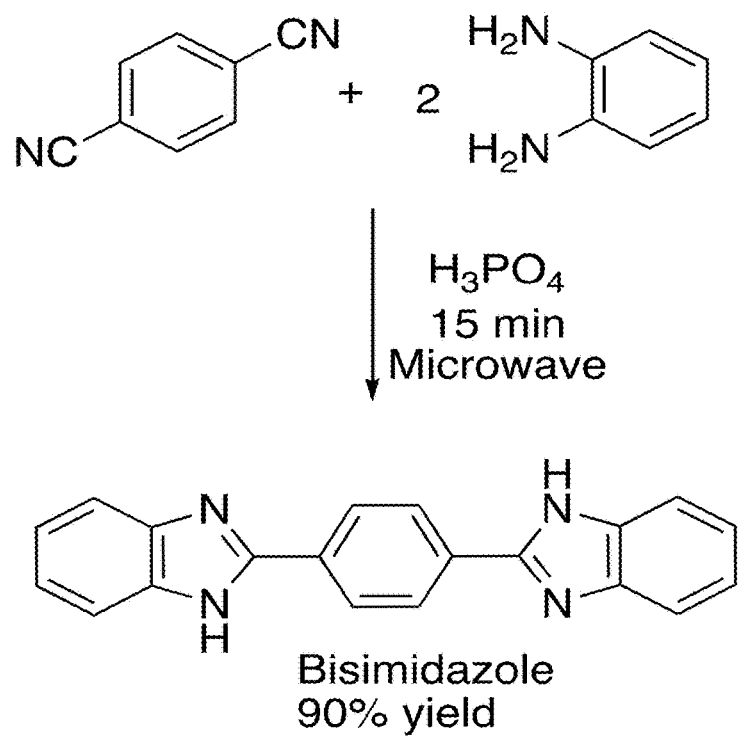
FIG. 1B illustrates the chemistry of FIG. 1A applied to 1,4-dicyanobenzene and 1,3,5-tricyanobenzene to produce the bisimidazole.
Figure 1C:
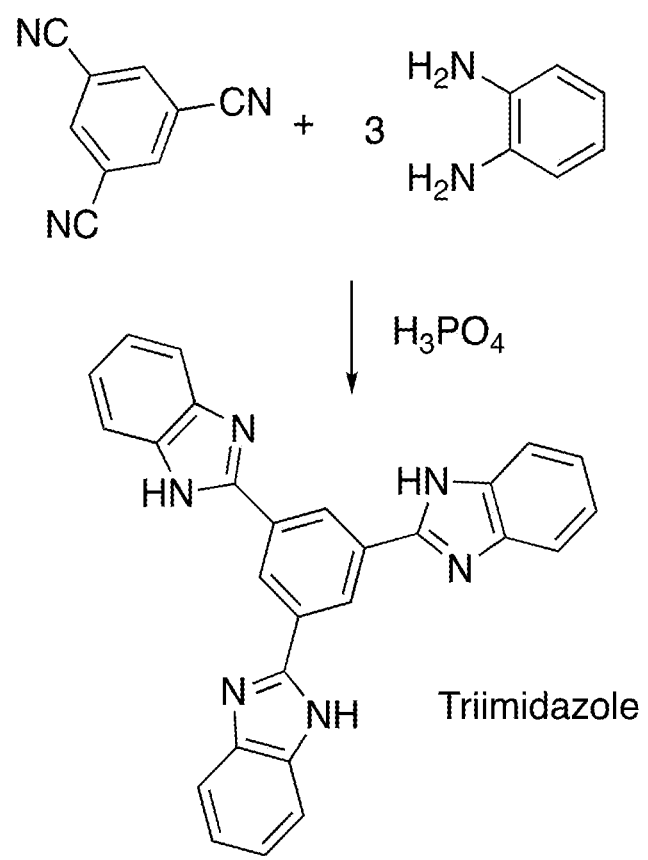
FIG. 1C illustrates the chemistry of FIG. 1A applied to 1,4-dicyanobenzene and 1,3,5-tricyanobenzene to produce the triimidazoles.

Incorporation of imidazole functional groups as appendages in polymers has been shown to significantly increase facilitated transport of $CO_2$.[12-14] Formation of imidazoles by reaction of diamines with nitriles has been reported and proceeds in excellent yields using microwave reactions. FIG. 1A illustrates an existing reaction[15] using a microwave for 15 minutes. As test reactions, this chemistry was applied to 1,4-dicyanobenzene and 1,3,5-tricyanobenzene to produce the bis and triimidazoles, respectively in FIGS. 1B and 1C.

Figure 2A:
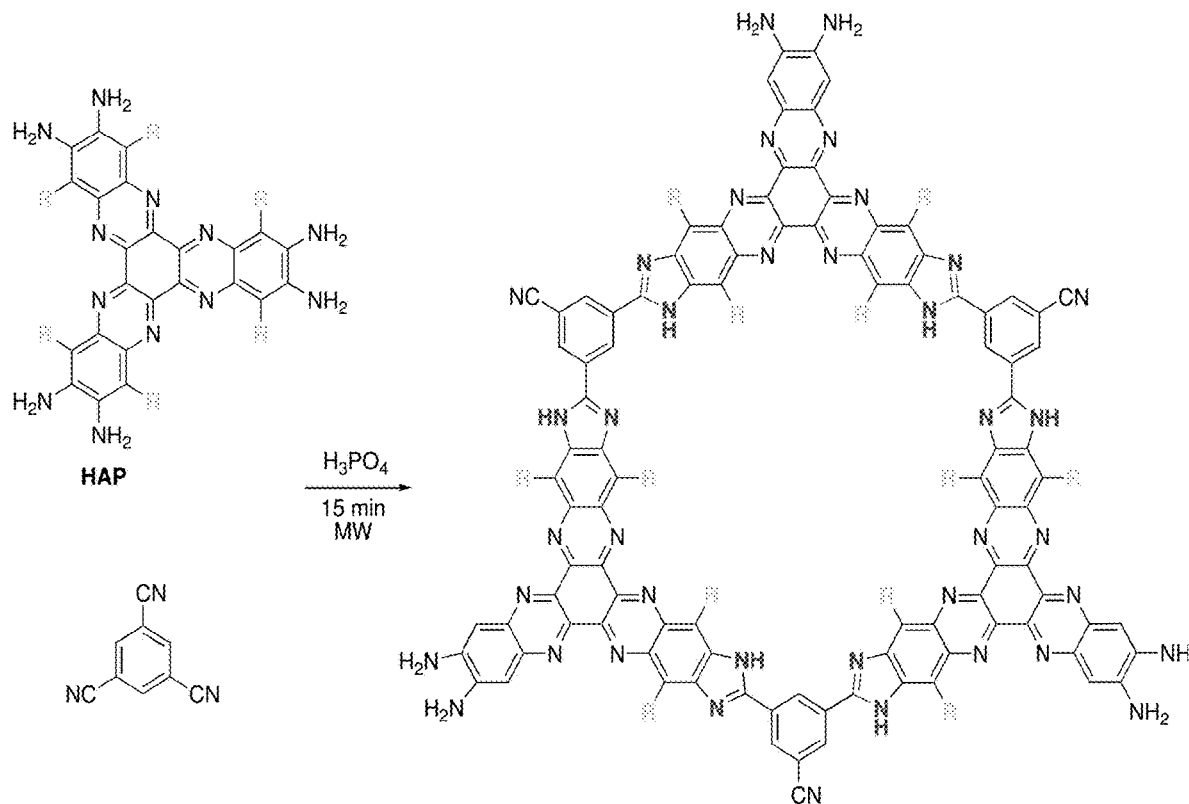
FIG. 2A illustrates the formation of an imidazole based COF using HAP and 1,3,5-tricyanobenzene and a variety of R groups.
Figure 2B:
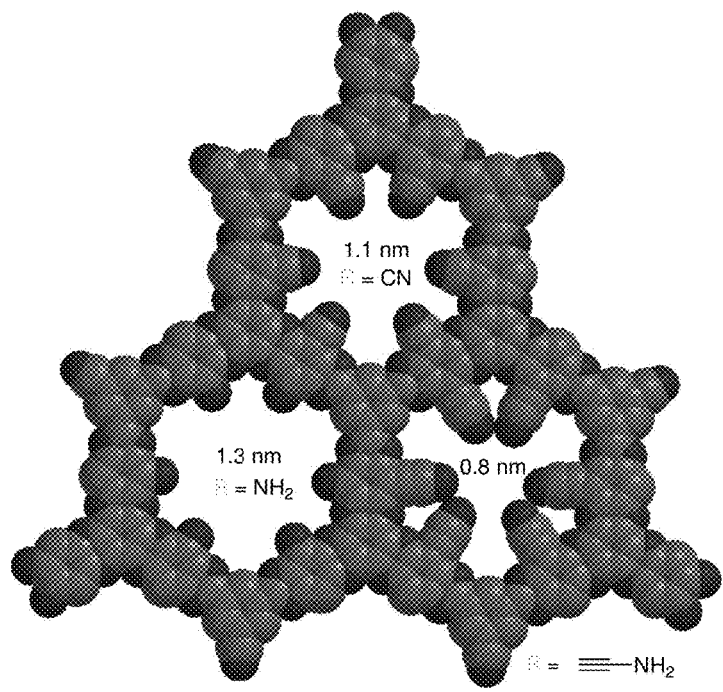
FIG. 2B is a space-filled model of the three different amine analogs of FIG. 2A.
Figure 4B:
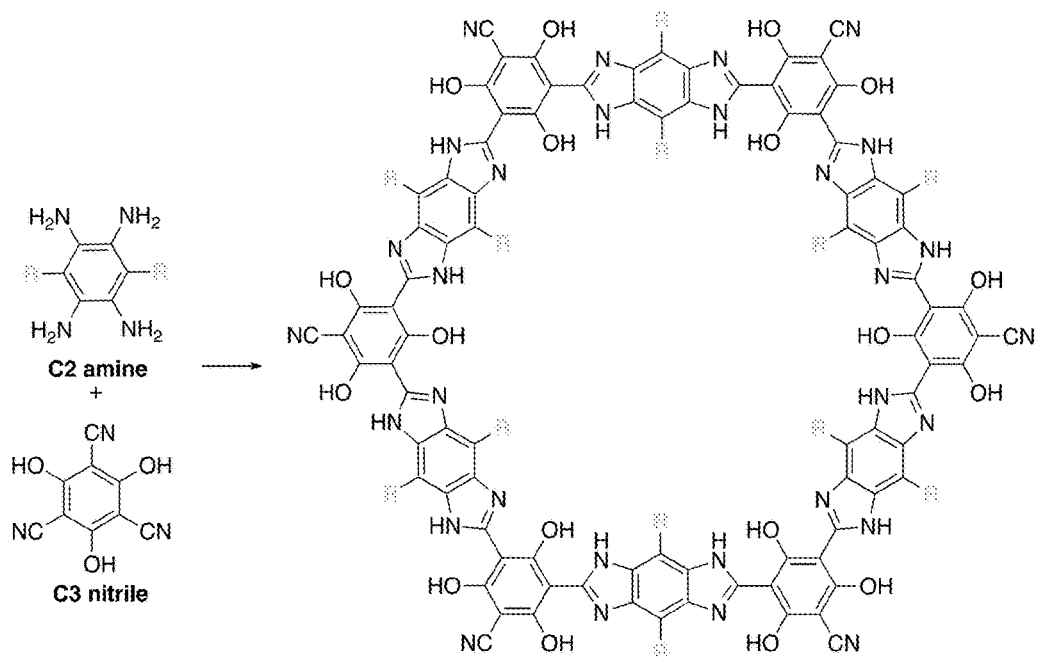
Figure 4C:
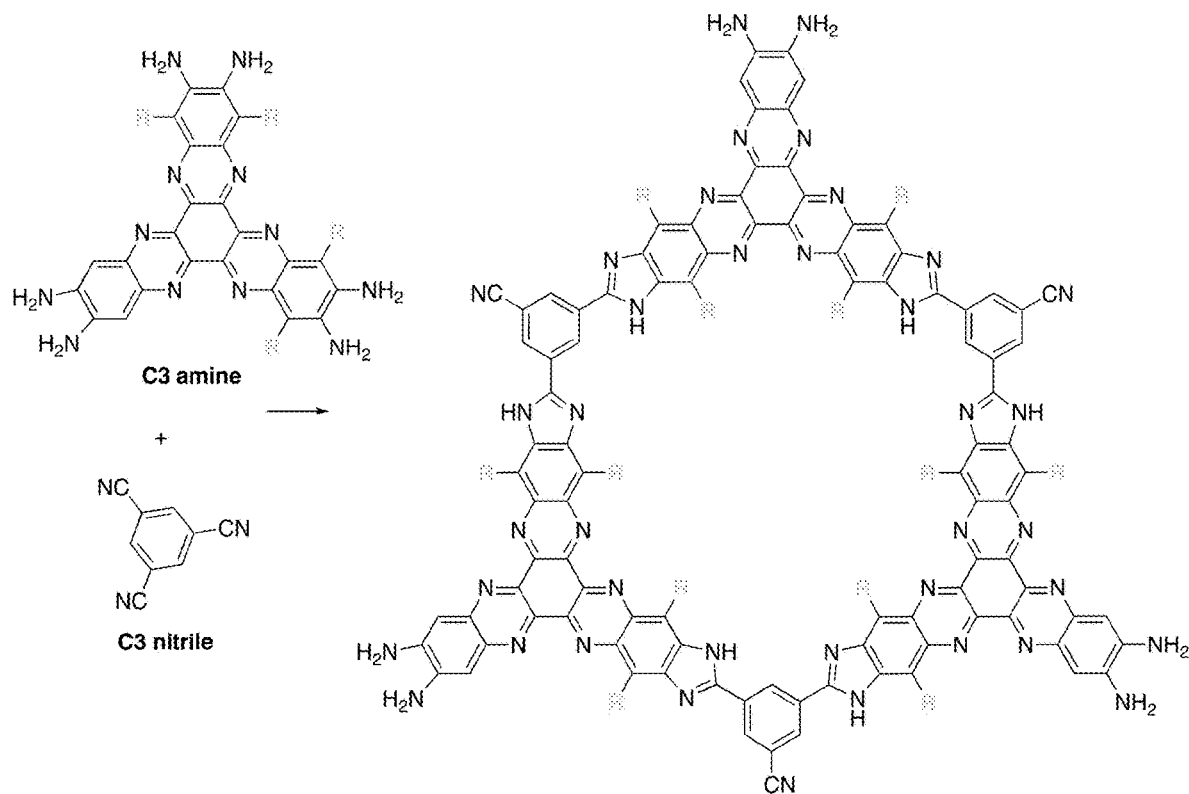
Figure 4D:
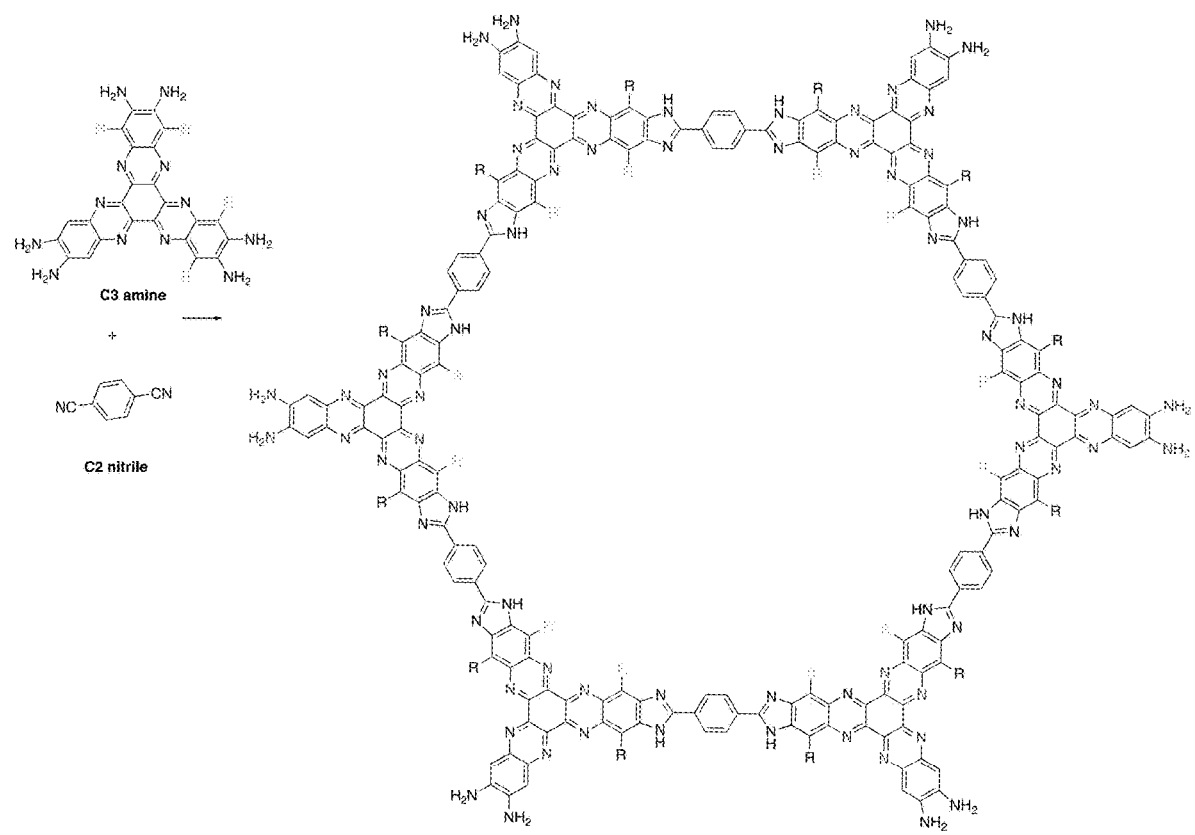
Figure 5:
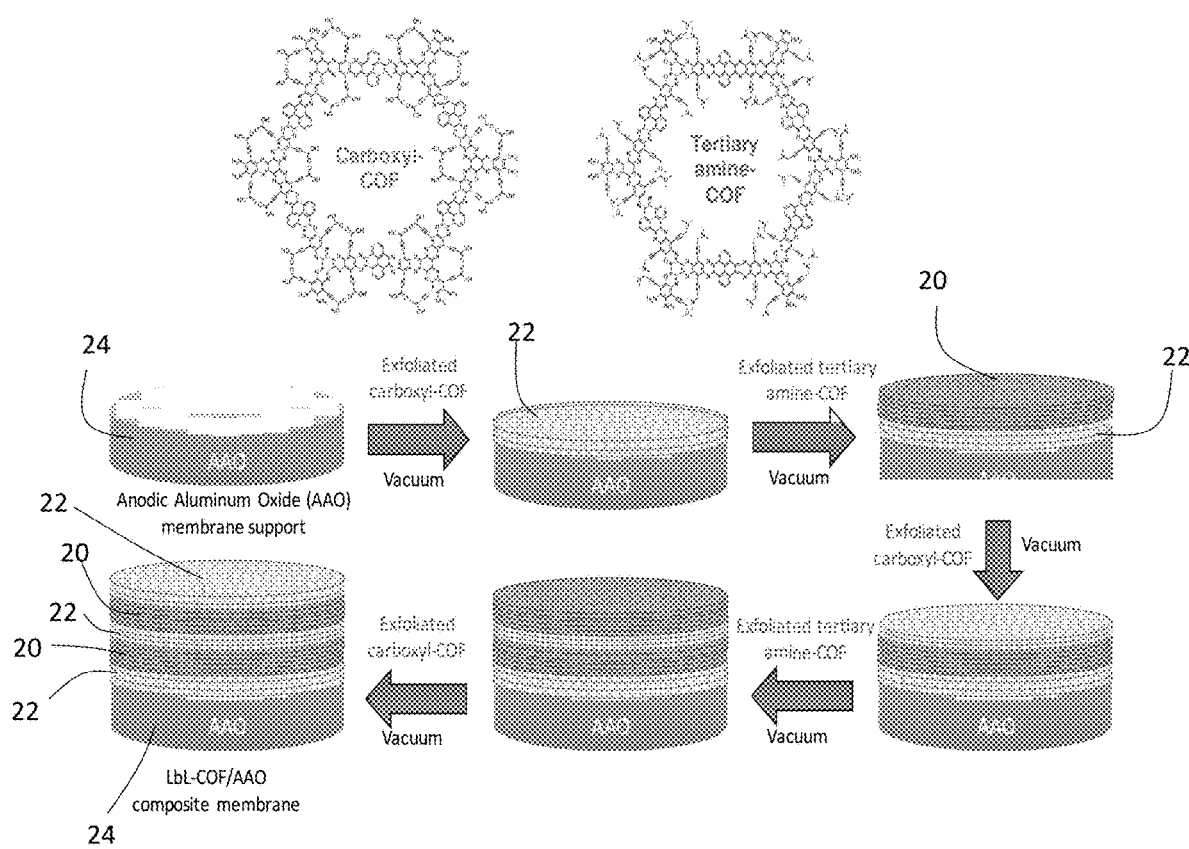
FIG. 5 shows a schematic representation of COF structures and the fabrication of layer-by-layer (LbL)-COF/anodic aluminum oxide (AAO) composite membrane in accordance with embodiments of the invention.
Figure 6A:
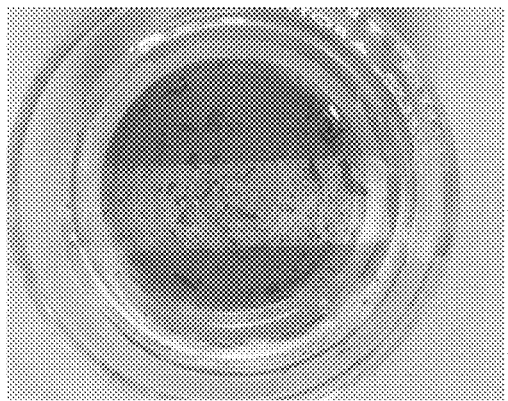
FIGS. 6A-6D are a series of photographs showing the stability of LbL-COF/AAO composite membrane where the membrane is readily disintegrated in water (FIG. 6A) after immersing while the membrane remained intact in methanol (FIG. 6B), N,N-dimethylformamide (DMF) (FIG. 6C), and ethanol (FIG. 6D) after 30 min in accordance with embodiments of the invention.
Figure 6B:
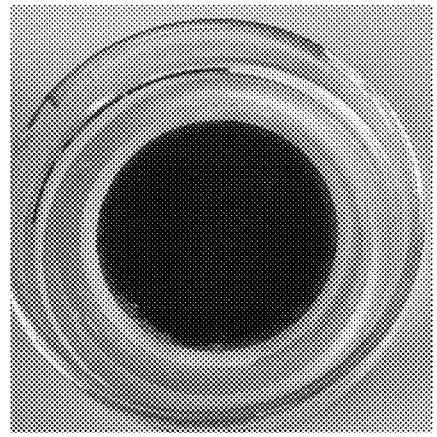
Figure 6C:
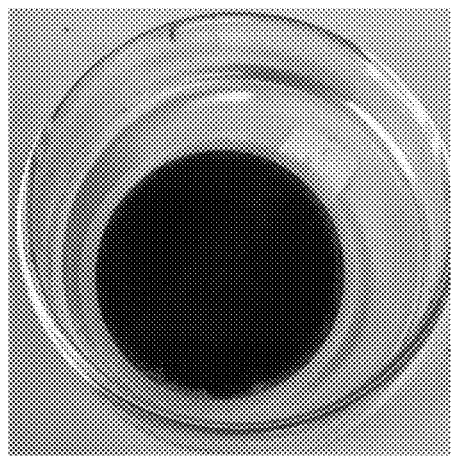
Figure 6D:
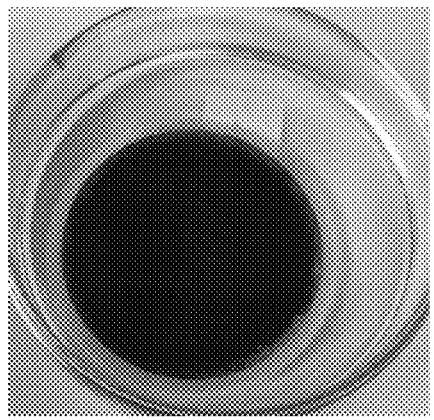

FIG. 2A illustrates a specific inventive embodiment of synthesis of HAP and its derivatives at the R position.[16] As shown in FIG. 2A there is a formation of an imidazole based COF using HAP and 1,3,5-tricyanobenzene and a variety of R groups. FIG. 2B is a space-filled model of the three different amine analogs of FIG. 2A.

In additional inventive embodiments it is appreciated that other monomers of nitriles and diamines may illustratively be used as shown in FIGS. 3A-3D as building blocks for assembly of COFs from C3 and C2 symmetry groups.

The symmetry groups may be compiled in inventive embodiments of COFs as shown in FIGS. 4A-4D for a single resultant pore. The single pore may be further functionalized by substitution of the imidazole NH hydrogen. This includes cross-linking layers.

It is further noted that the nitrile (CN) may be replaced carboxylic acids. For Example, the nitrile (CN) is readily replaced with a carboxylic acid (COOH).

According to some inventive embodiments, a highly ordered COF is synthesized with ionizable carboxylate groups in 2.8 nm pores and demonstrates high membrane selectivity to only conduct cations smaller than a precise pore size threshold. Additionally, related inventive membranes materials are readily synthesized to either increase or reduce this pore size threshold or make yield anionic selective membranes. These 2D-COF materials achieve the goal of a modifiable, highly ordered material and are synthesized in a bottom up approach, thereby providing both a stable aromatic backbone and producing functionalized pores either in the small precursor molecules or after synthesizing the COF using well known high yield coupling reactions to replace moieties extending into pore areas with substituted moieties so as to modify pore properties. Substituted moieties operative herein illustratively include halogens, amines, hydroxyls, carboxyls, peptides, ammoniums, oniums, alkanes, alkenes, silanes, sulfonyls, and phosphates. It is appreciated that with resort to chiral substituted moieties that chiral selectivity is imparted to an inventive membrane.

It is also appreciated the pore moieties are also selective reacted with a cap species, to selectively close a pore. In instances when the cap species is a precious metal or contaminating metal present in low concentrations such as radioactive contaminants, an inventive membrane serves as a cap species accumulator.

It is to be understood that in instances where a range of values are provided that the range is intended to encompass not only the end point values of the range but also intermediate values of the range as explicitly being included within the range and varying by the last significant figure of the range. By way of example, a recited range of from 1 to 4 is intended to include 1-2, 1-3, 2-4, 3-4, and 1-4.

Embodiments of the invention provide control of composite covalent organic frameworks (COF) by varying functional groups inside the pore of the COF. In a specific inventive embodiment a COF membrane consisting of both a carboxylated COF (C—COF, hydrophilic) and tertiary amine lined pore (N—COF, hydrophobic) supported on an anodic aluminum oxide (AAO) substrate with an alternative layer-by-layer (LbL) was constructed as shown in FIG. 6. In FIG. 6 an anodic aluminum oxide (AAO) substrate 24 is a membrane support on which an exfoliated carboxyl COF is deposited under vacuum conditions. In subsequent steps exfoliated tertiary amine COF 20 and exfoliated carboxyl COF 22 are applied in alternating layers as a stack on the AAO substrate that forms a LbL-COF/AAO composite membrane. As shown in FIGS. 6A-6D it has been determined that the composite LbL COF membranes disintegrate in water, while the composite LbL COF membranes are stable in organic media, including methanol, N,N-dimethylformamide (DMF), and ethanol.

Figure 7A:
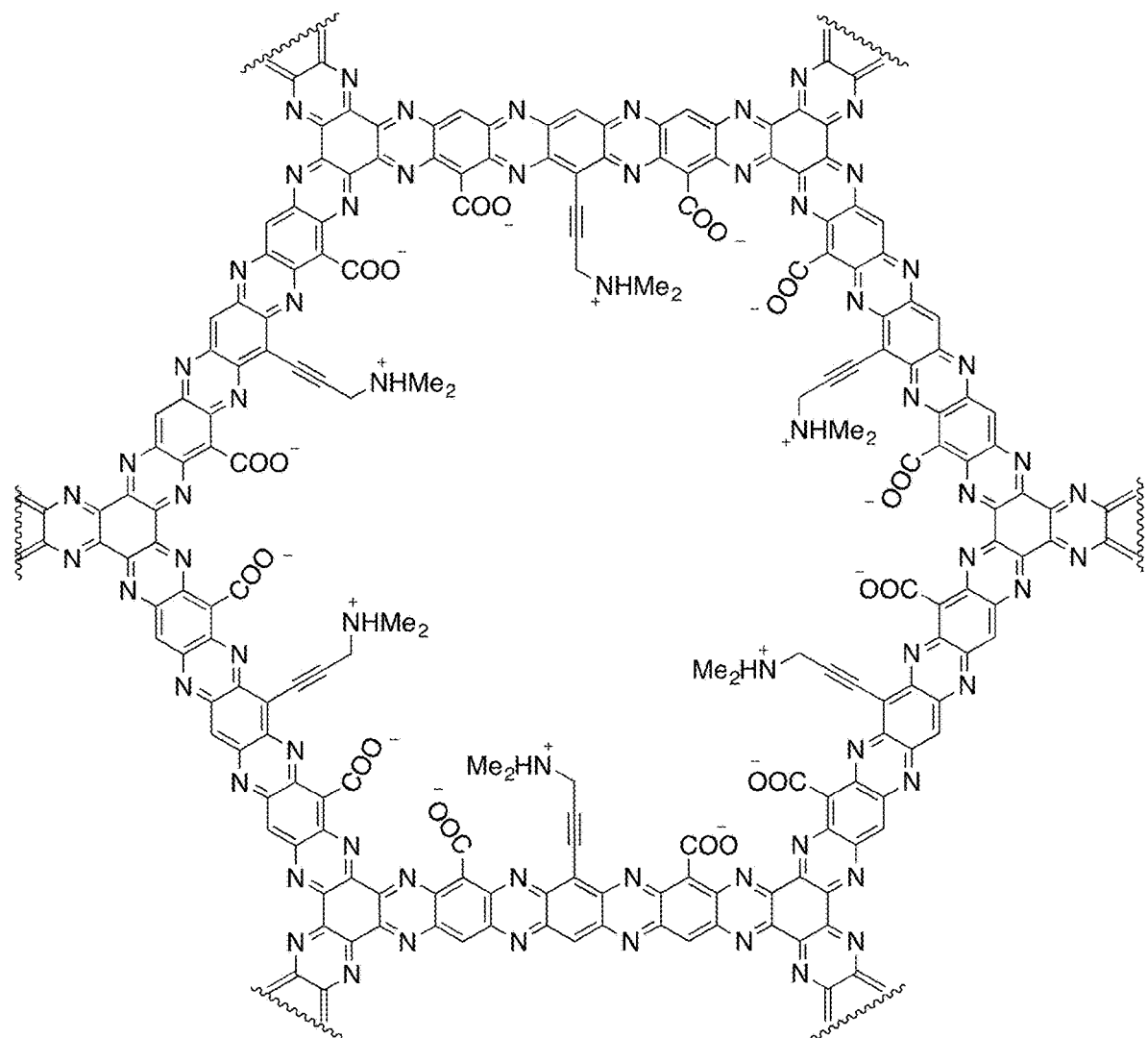
FIGS. 7A-7C illustrate charge manipulation of a zwitterion containing pore where
Figure 7B:
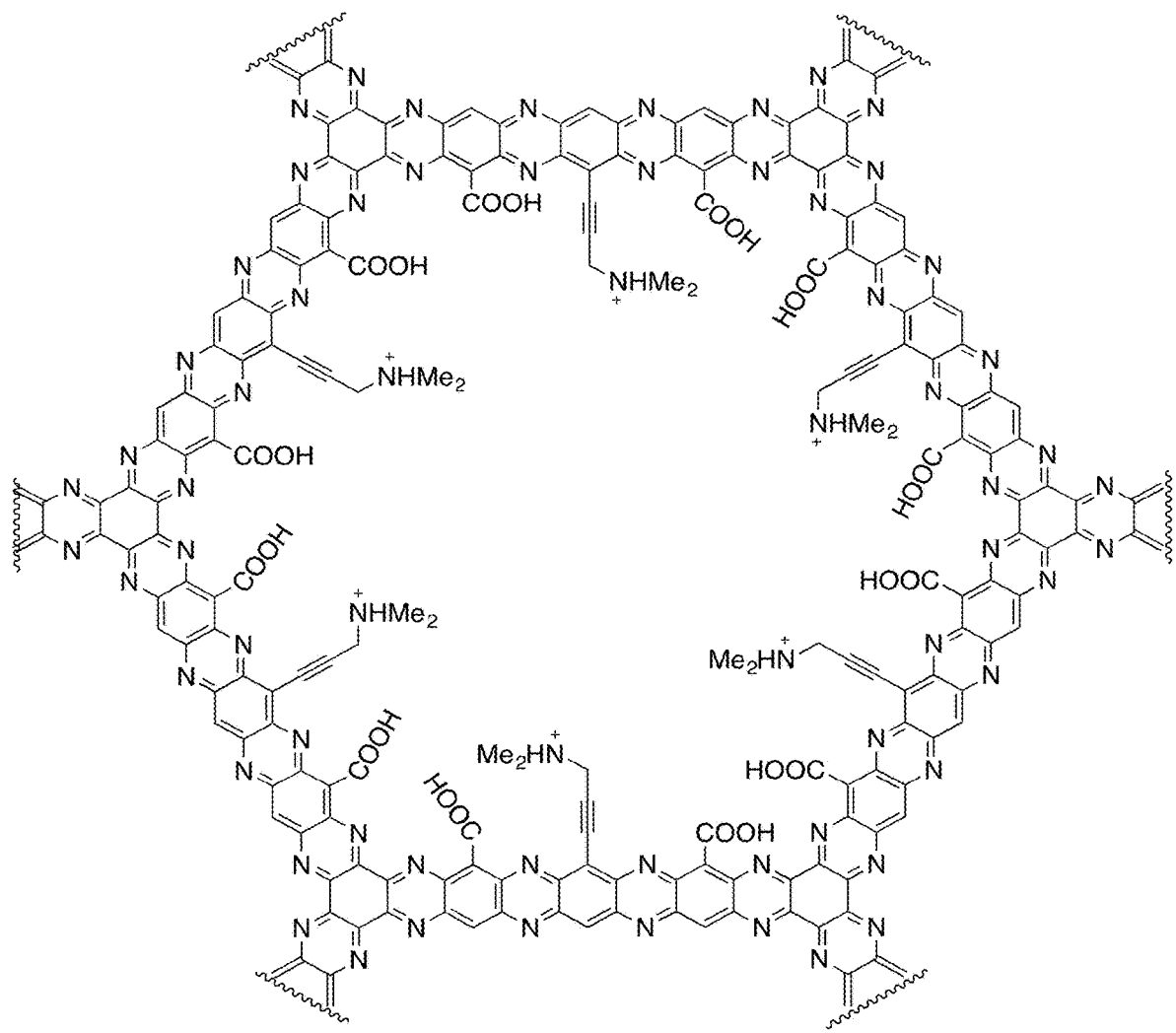
Figure 7C:
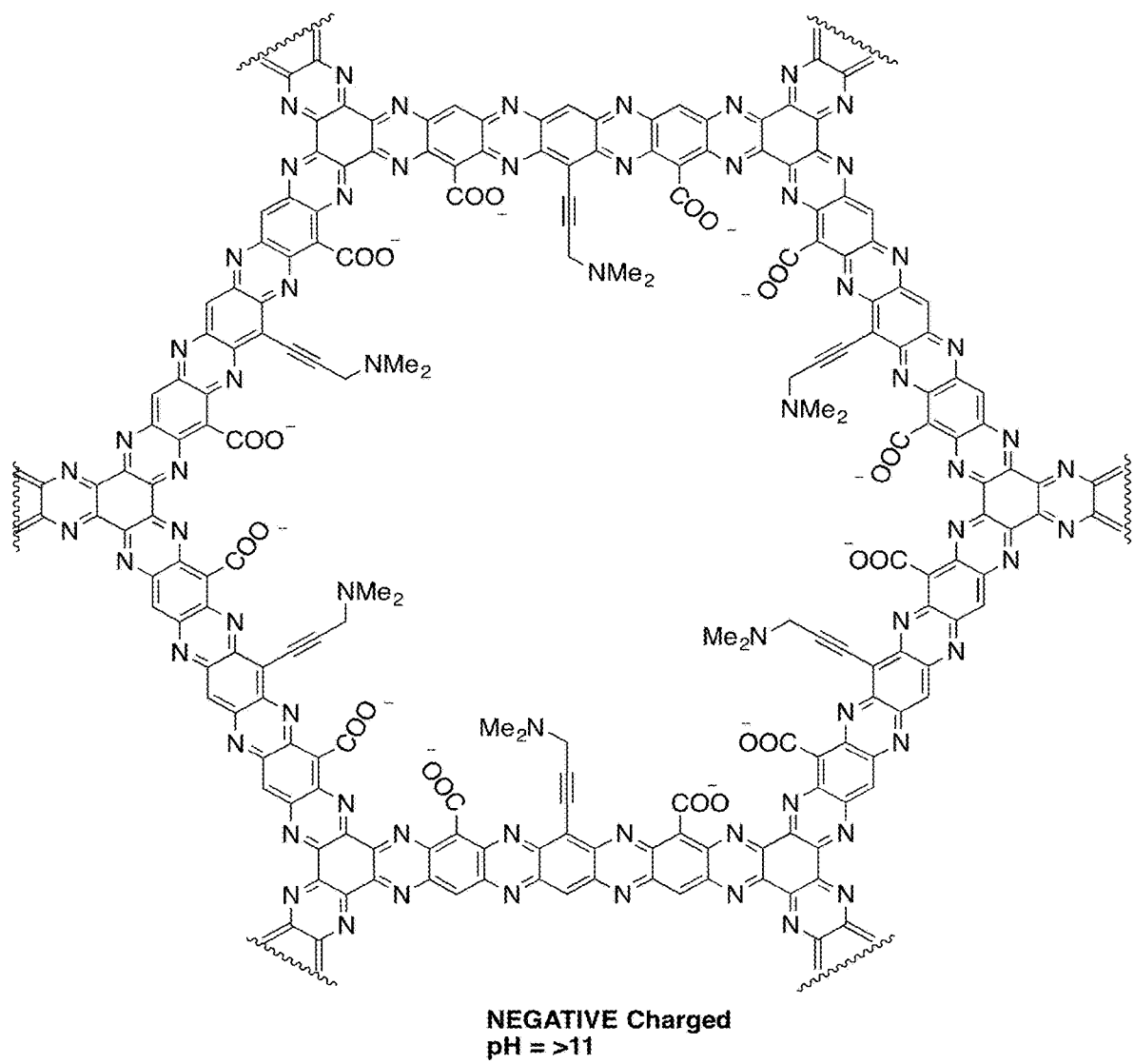
Figure 8A:
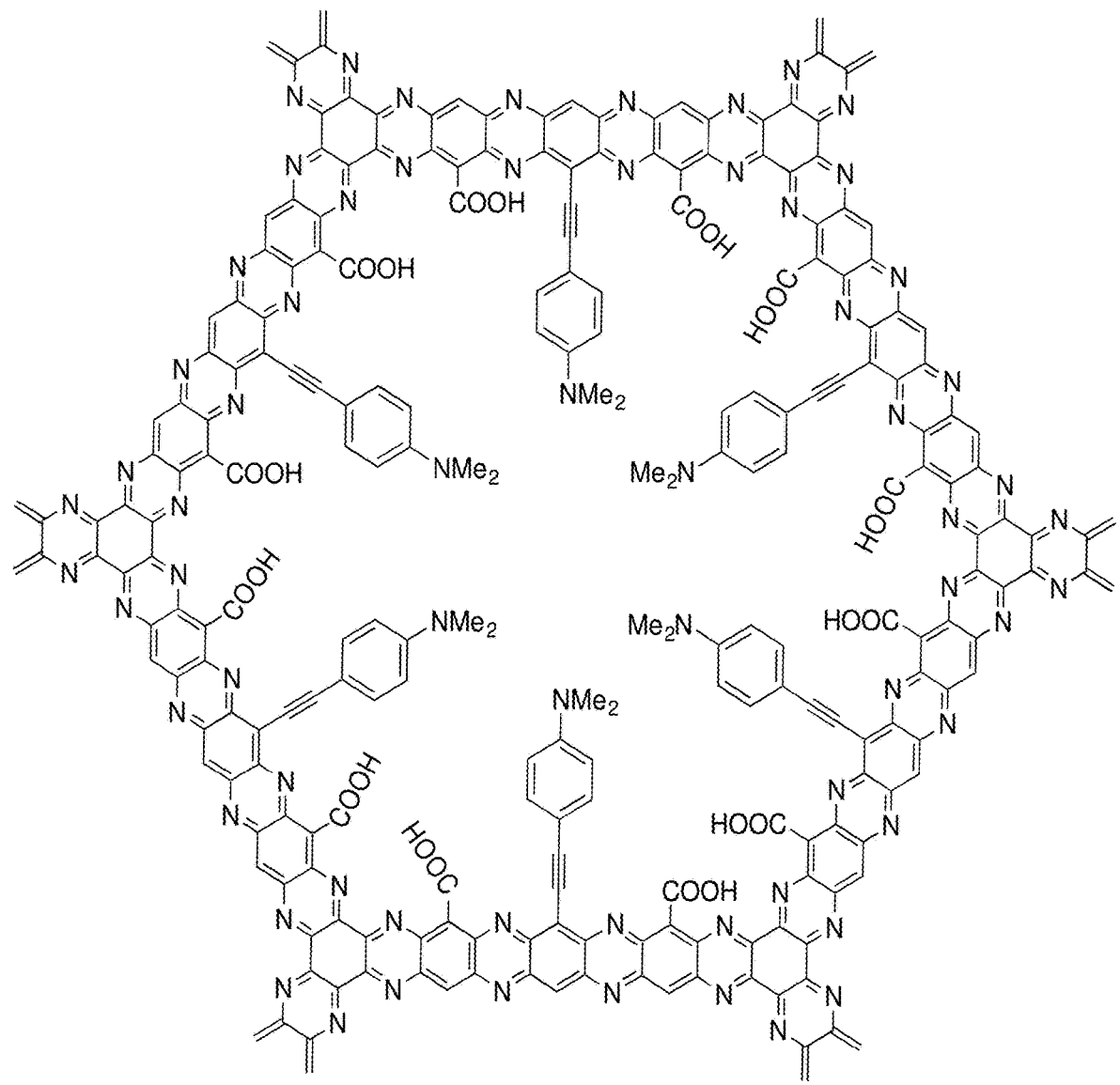
FIGS. 8A and 8B illustrates an example of a second generation zwitterion with reduced pore size and tuning of the zwitterion window in accordance with an embodiment of the invention.
Figure 8B:
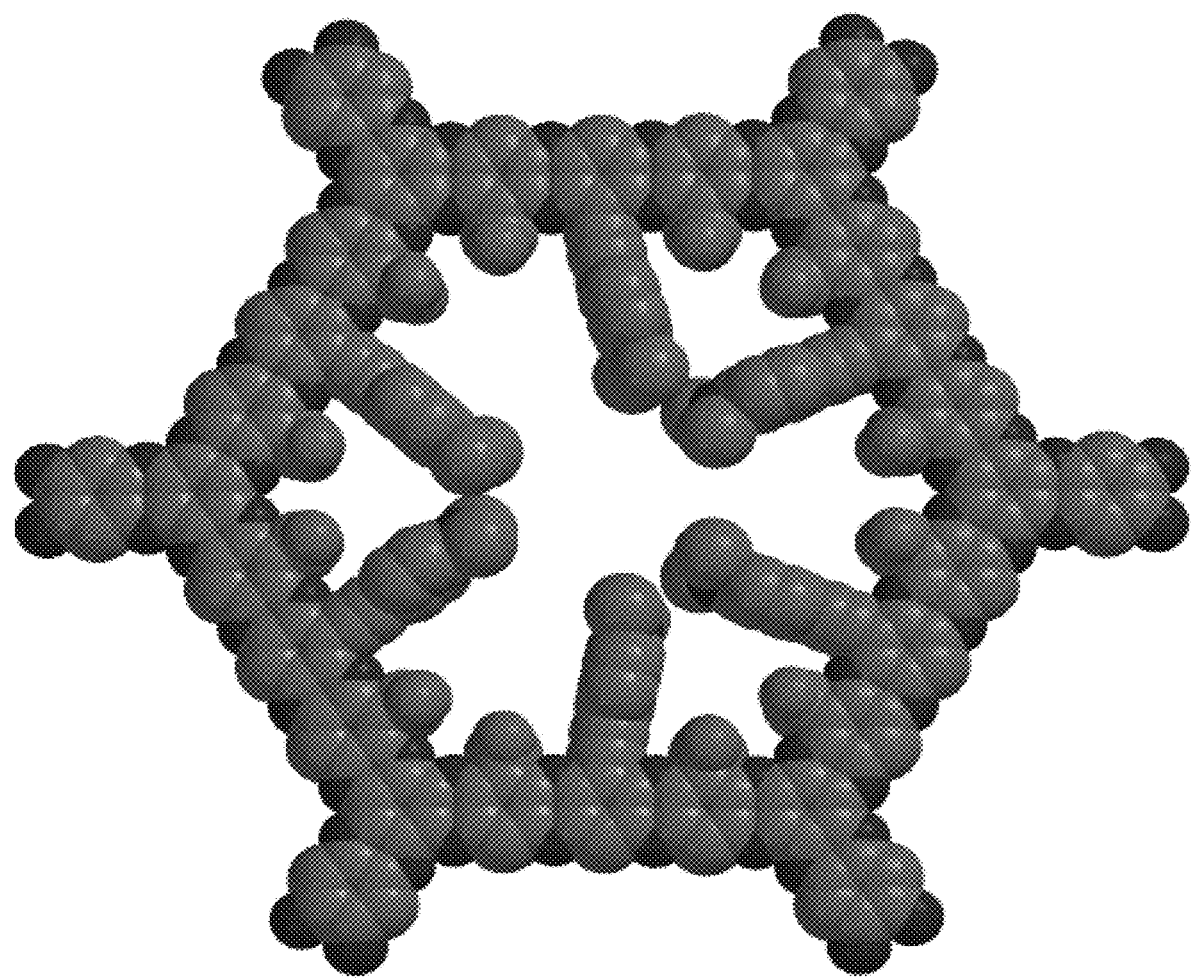

In specific inventive embodiments multilayer COF membranes may be formed using the mixed zwitterion with the single pore by a simple combination of carboxylated groups and amines. A zwitterion is a molecule with two or more functional groups, of which at least one group has a positive and one group has a negative electrical charge and the net charge of the entire molecule is zero. As shown in FIGS. 7A-7C the pH levels determine the charge of the molecules. In FIG. 7A at pHs between approximately 4-11, the zwitterion form will exist and provide strong hydration through electrostatic interactions with water molecules, while simultaneously providing a physical and energetic barrier against, for example, protein adsorption. The secondary structure assumed by proteins produces a heterogeneous but characteristic distribution of surface charges that largely dictates their ability to bind to surfaces. Generally, proteins can only bind to surfaces with a uniform charge. Surfaces that display heterogeneous charge density, for instance, zwitterionic surfaces, demand that proteins modify their structure (denature) to conform to the surface charge density in order to adsorb. Consequently, proteins are thus prevented from binding or, in some cases, repelled from the surface with heterogeneous charge density. Alternatively, adjusting the pH to less than 4 (<4) will produce a positively charged pore as shown in FIG. 7B, allowing passage of anionic substrates. Finally, a pH greater than 11 (>11) will produce a negatively charged pore (FIG. 7C) to allow passage of cations. In inventive embodiment the ranges may be fine-tuned by using inductive effects on both the amine and carboxyl moieties. For example, replacement of the N,N-dimethylpropynylamine with para-ethynyl-N,N-dimethylaniline will not only change the $pk_a$ of the protonated amine from a pH of approximately 11 to approximately 5.5, but will greatly reduce the pore size to 1.2 nm as shown in FIGS. 8A and 8B. FIGS. 8A and 8B show an inventive example of a second generation zwitterion with reduced pore size and tuning of the zwitterion window. Furthermore, switching the COOH with CH=CHCOOH moves the acid $pk_a$ from approximately 4 to 2.

Figure 9A:
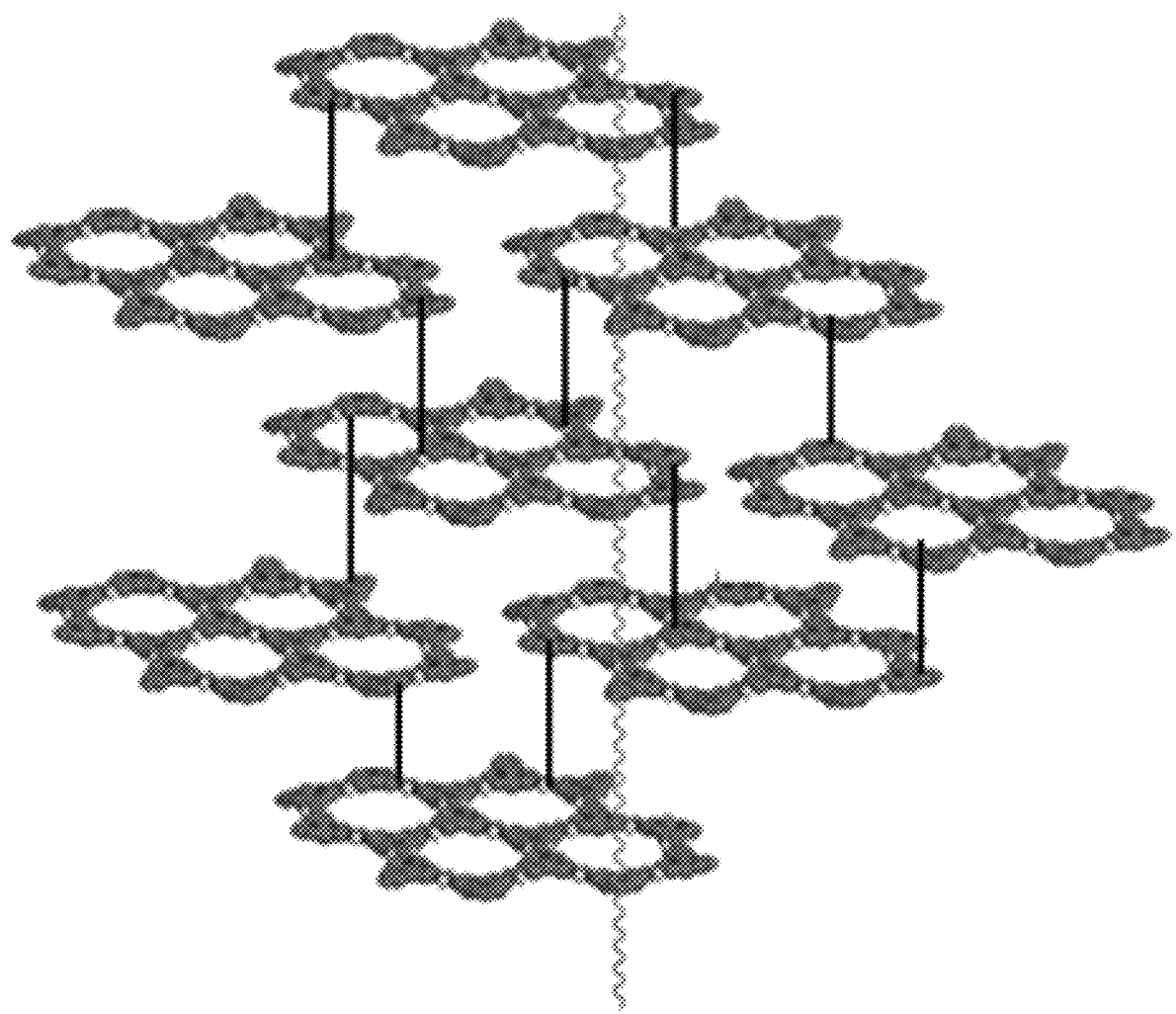
FIGS. 9A-9C illustrate the cross-linking of a first COF structure (COF 1) and a second COF structure (COF 2) in accordance with embodiments of the invention.
Figure 9B:
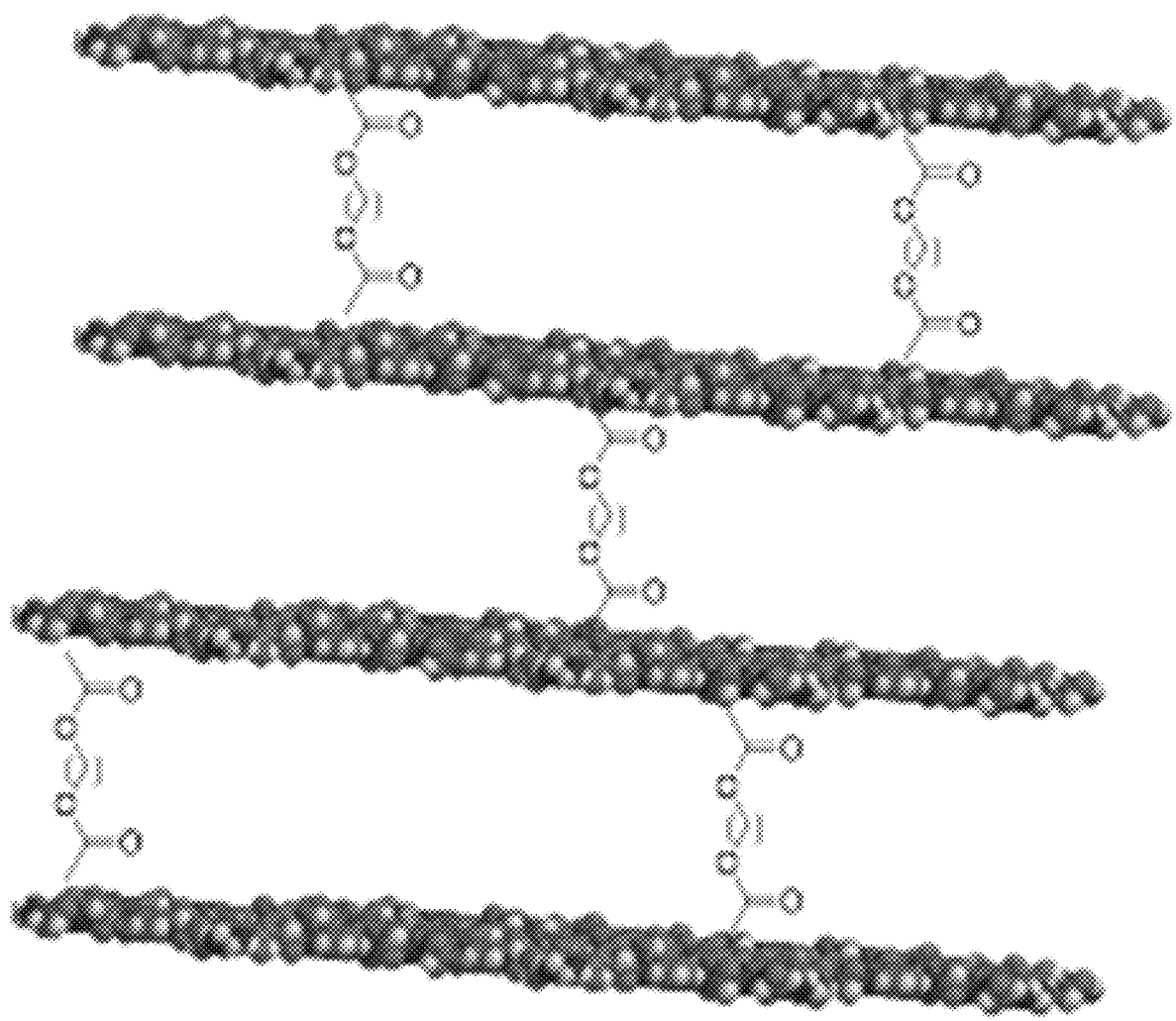
Figure 9C:
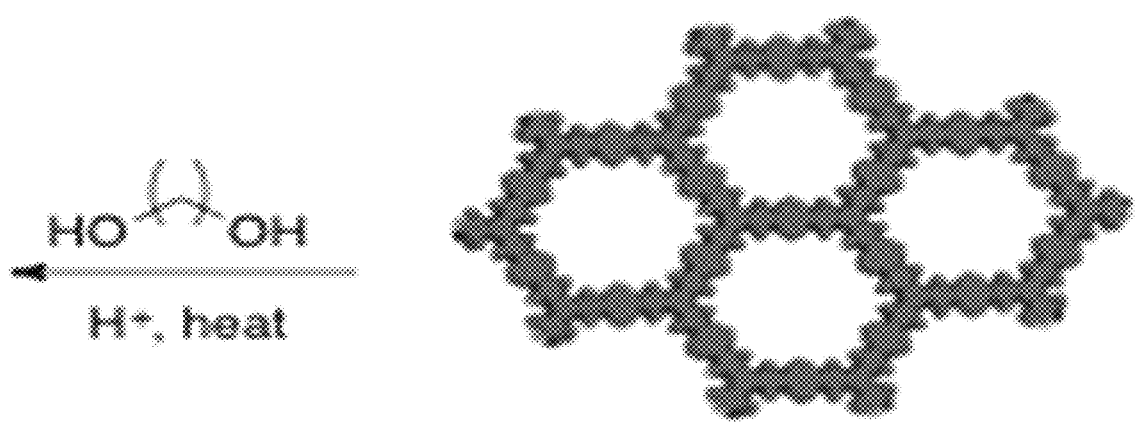

In an inventive embodiment, an additional modification that allows further solid-liquid interactions is to cross-link the two dimensional (2D) COF sheets. FIGS. 9A-9C illustrate the cross-linking of a first COF structure (COF 1) and a second COF structure (COF 2). In FIG. 9A, the sheets of COF 2 are cross-linked via metal-ligand binding. This cross-linking aligns the channels as illustrated with the wavy lines. Secondly in FIG. 9B, cross-linking of COF 1 is achieved via esterification of carboxyl groups. Using a mixed COF that incorporates a carboxylic acid moiety in the pore, an acid-catalyzed esterification using reagents, illustratively including ethylene glycol, imparts connectivity between layers as shown in FIG. 9C. In both examples, only a small level of cross-linking needs to be accomplished (approximately 5%) to form the desired channels.

Figure 10A:
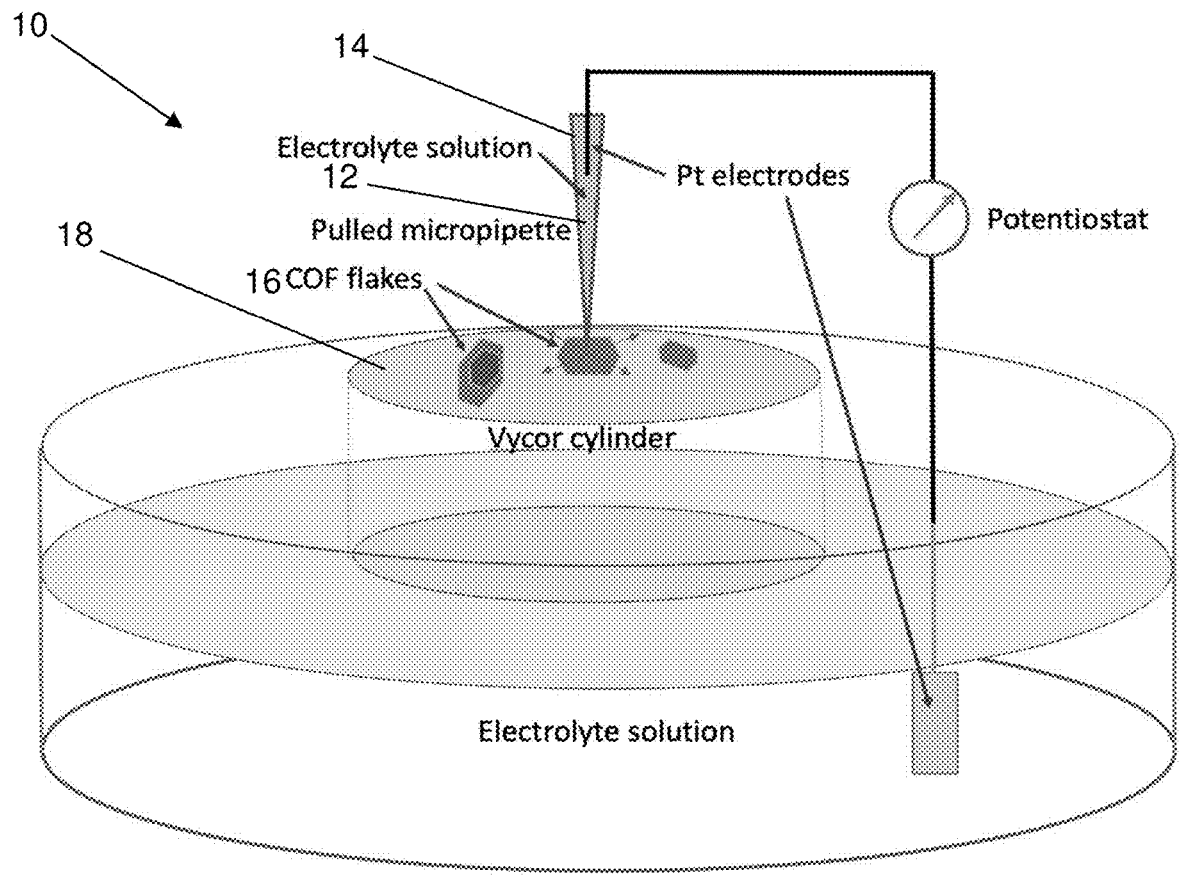
FIGS. 10A and 10B illustrate a schematic representation of the application of a scanning electrochemical cell microscope for the investigation of thin single particle 2D-COF membranes in accordance with embodiments of the invention.
Figure 10B:
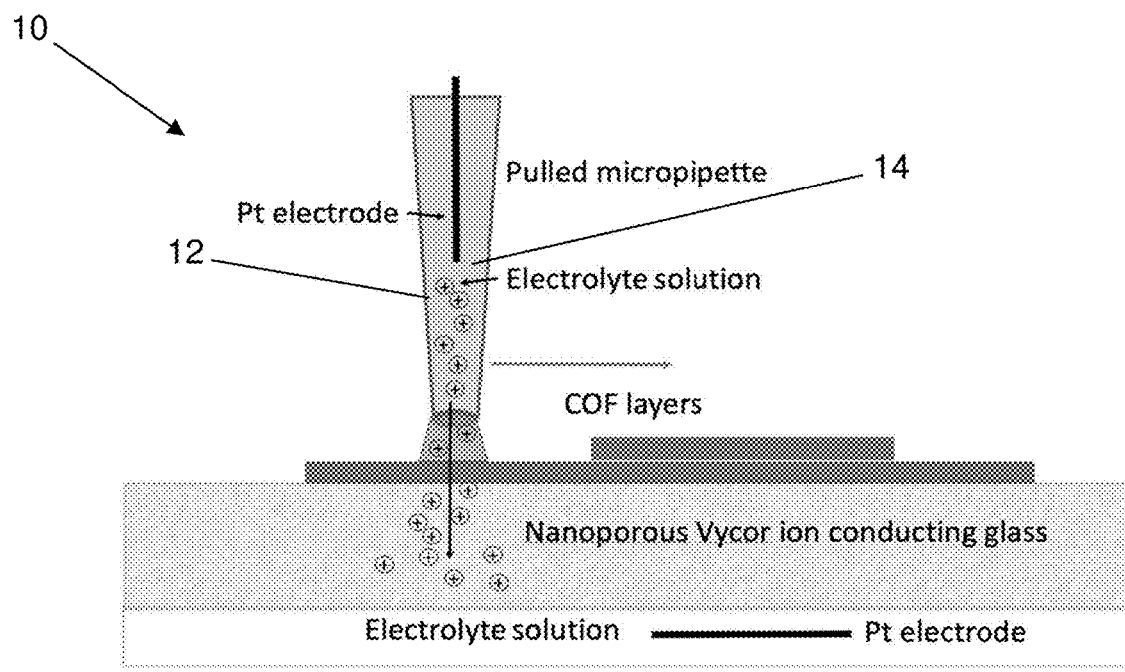

Embodiments of the inventive COF-based membranes may have both high selectivity and permeability for a few different liquid separations. The fundamental limits of these parameters have smaller and thinner membranes with the goal of measuring properties of the ultimate single layer crystalline flake such that have dimensions on the order of several hundred nanometers on a side. In specific inventive embodiments, using seeding techniques the size of single crystal sheets has been increased by introducing highly ordered small sheets into the reaction mixture to favor grain growth rather than new nucleation to produce flakes up to many microns in diameter. Ion transport measurements using single layer membranes were made to resolve the controversy of whether graphene itself was a proton specific membrane due to tunneling through the middle of the benzene-like rings in graphene. The experimental details are given by Hu et al. in the supplementary information of their recently published work. Briefly, this reported technique mounted micrometer scale sheets of graphene onto pulled micropipettes immersed in an electrolyte to establish that defect free layers did not conduct protons and that when small ion currents were measured, the small ion currents could be associated with defects in the graphene layers. In inventive embodiments, a similar technique is used to measure the fundamental maximum of ion conductivity and selectivity of the inventive COF membranes using small crystalline sheets of COF materials. Specifically, a pipette puller was used to produce the micro- and nano-meter pore sizes in glass capillaries as was done in references.[17,18] However, unlike that experiment, where the hydrophobic graphene was floated on top of the electrolyte, the hydrophilic membrane flakes are supported on cylindrical Vycor glass with approximately 1 millimeter thickness as shown in FIGS. 10A and 10B, since the COF membranes may not float on electrolyte solutions, due to their hydrophilic nature. Vycor is a nanoporous glass with 1 to 10 nm pores making up 25-30% of the glass volume that has been used as an inert ion conducting media for isolating reference electrodes in electrochemical cells. Unlike the previously reported experiments, real-time imaging capabilities were used to measure the magnitude and uniformity or non-uniformity of the ion currents over the surface of the flakes using scanning electrochemical cell microscope (SECCM). A diffraction limited optical microscope is integrated into the SECCM that enables the identification of single and multiple flake regions of the single crystal COF flakes deposited on the substrate in a similar manner used to prepare TEM grids for COF imaging. By changing the composition of the electrolytes in the pipette and the reservoir, an ability to change the size and concentrations of both anions and cations to make groundbreaking measurements was achieved, which allowed for the investigation of the fundamental limits of both flux and selectivity for various ions in these novel COF membrane materials.

FIGS. 10A and 10B illustrate a schematic representation 10 of the scanning electrochemical cell microscope used in the investigation of thin single particle 2D-COF membranes. In FIG. 10A a pulled micro or nano sized pipette tip 12 is filled with an appropriate electrolyte solution 14 that is rastered over single 2D-COF flakes 16 supported on a polished ion conducting nanoporous Vycor glass surface 18. The change in the ion current is then measured as a function of position as compared with the higher ion flow when the tip is over a bare Vycor region. FIG. 10B is an expanded view of the tip region 12 showing the small electrochemical cell volume where ion flow can be measured as a function of position to determine the influence of the number of 2D-COF layers on the ion current. Judicious choice of electrolytes 14 in the Vycor and the pulled pipette 12 demonstrate the ultimate selectivity of the membrane for various sizes and charges of ions as a function of membrane structure and order.

Figure 11:
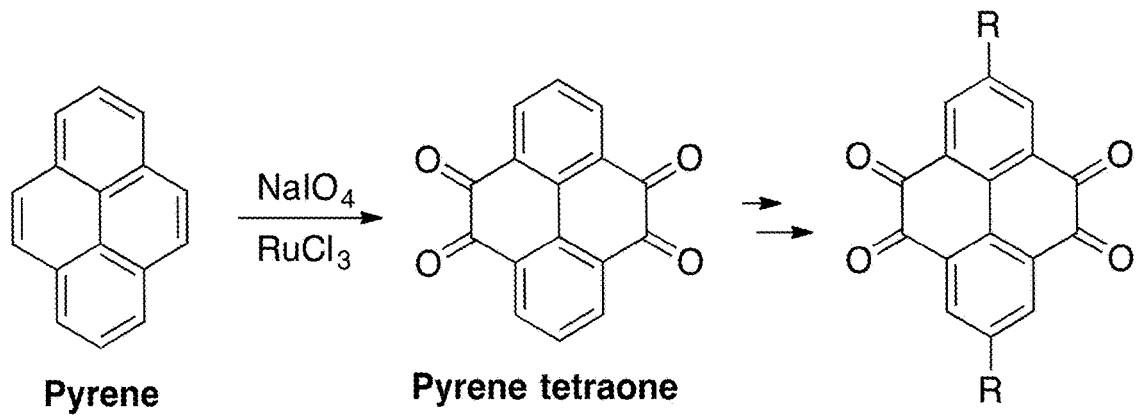
FIG. 11 is an existing synthesis process for single pore COFs that uses pyrene tetraone.

Embodiments of the invention provide a new alternative pyrene tetraone synthesis. For the current construction of the single pore COFs, pyrene tetraone is used. Pyrene tetraone is synthesized in approximately 10-15% yields (FIG. 11) using a published procedure[19] which is then derivatized in multiple steps to put R groups on (e.g. Br, COOH).

Figure 12:
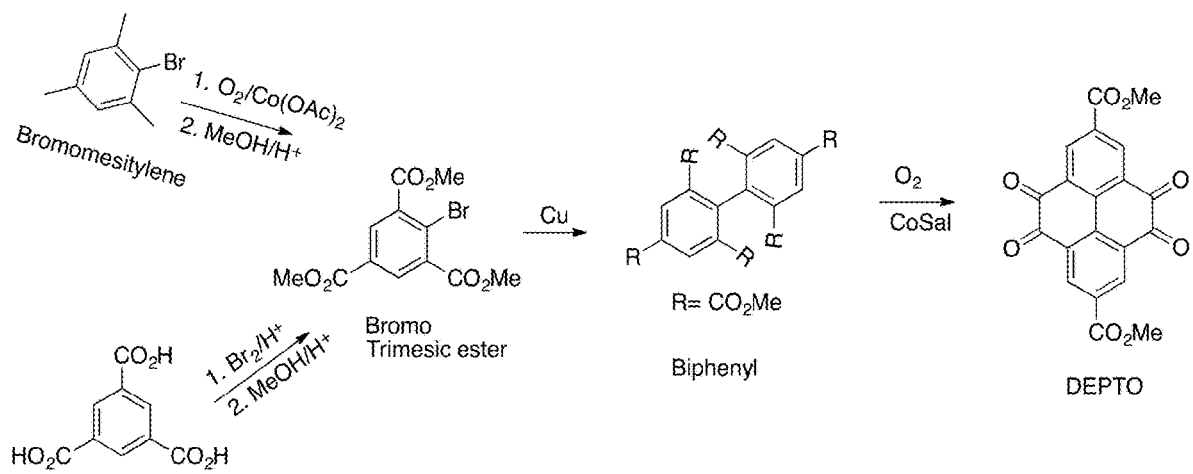
FIG. 12 illustrates a reaction for yielding diester pyrenetetraone (DEPTO) in accordance with an embodiment of the invention.
Figure 13:
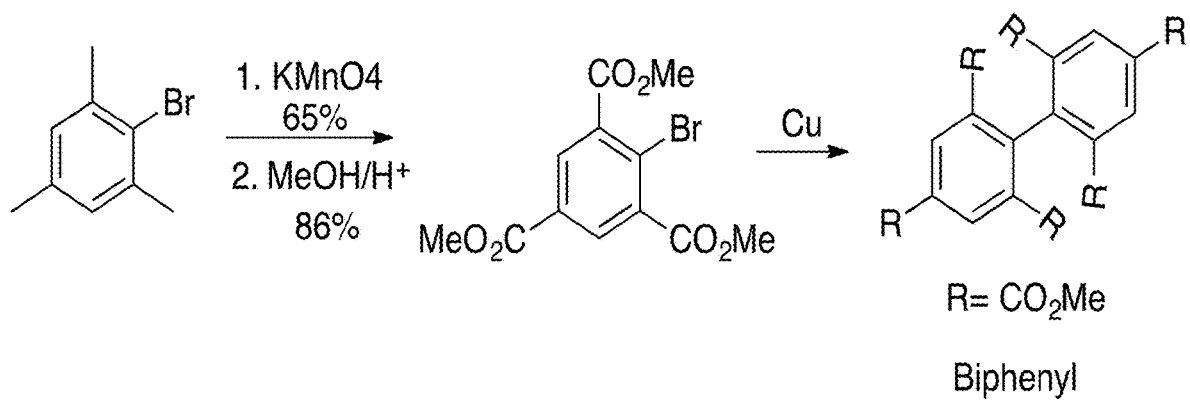
FIG. 13 illustrates an existing reaction for the synthesis of the Biphenyl adduct.
Figure 14:
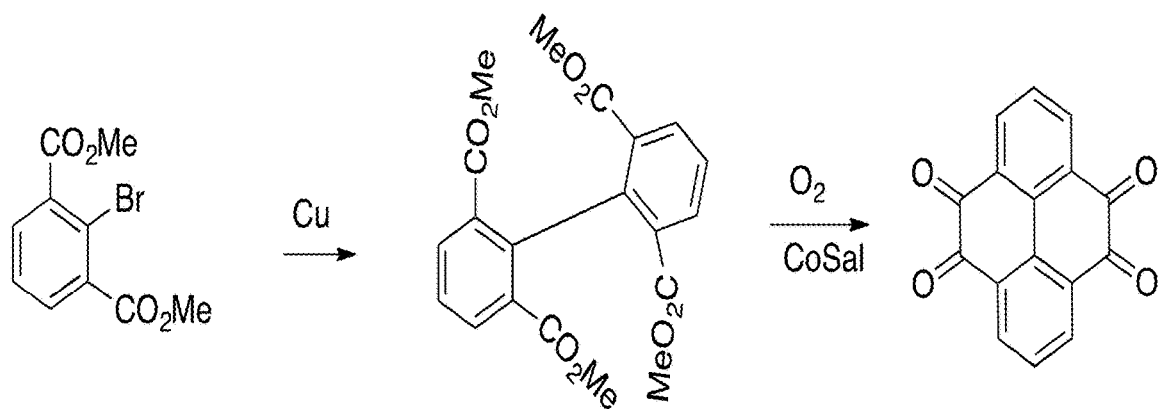
FIG. 14 illustrates an existing reaction that couples 2,6-diformic acid Me ester-1-bromobenzene with copper powder in organic solvent DMF to yield pyrene tetranone.
Figure 15:
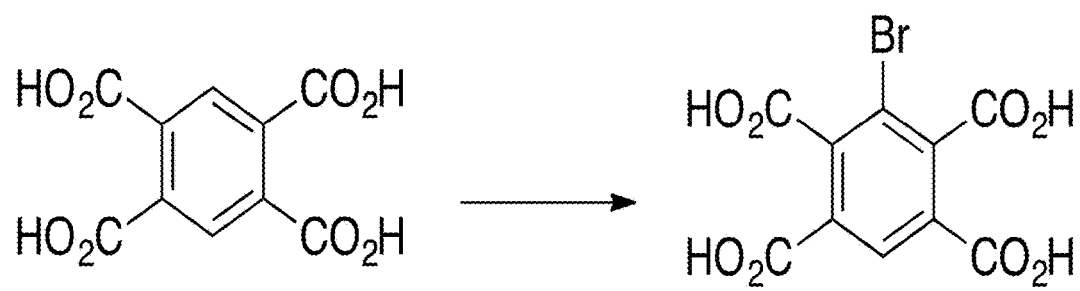
FIG. 15 illustrates an existing procedure for the bromination of pyromellitic acid.

The new target is DEPTO (diester pyrenetetraone) and the overall synthesis of DEPTO is outlined in FIG. 12, which includes two new routes to the Bromo Trimesic ester. Mesitylene derivatives illustratively including Bromomesitylene and Trimesic acid are commercially available and are very inexpensive. The reaction shown in FIG. 12 is based on two published procedures. The first procedure is outlined in FIG. 13 for the synthesis of the Biphenyl adduct. The KMnO4 is in seven fold excess and generates large amounts of waste by-products and thus is very undesirable for scale-up. The yield is also rather poor. Thus, in inventive embodiments only the Cu step is used. The second procedure is shown in FIG. 14 and is based on a Chinese patent (CN102617317A). The bis(salicylidene)ethylenediamine cobalt is used as a catalyst (second step). The starting material in the second procedure is expensive and thus the use of the above mesitylene route is a very inexpensive alternative. Finally, the proposed bromination of Trimesic acid is based on a procedure for the bromination of pyromellitic acid shown in FIG. 15.

Figure 16:
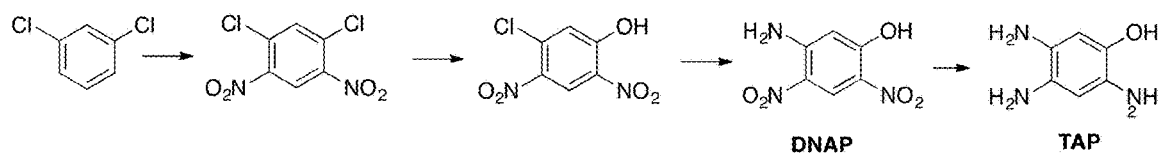
FIG. 16 illustrates a reaction for formation of TAPS.
Figure 17:
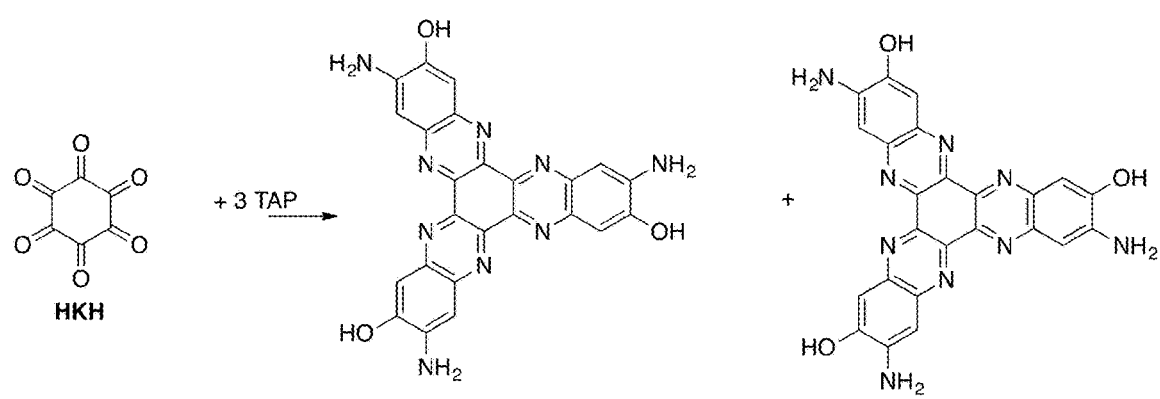
FIG. 17 illustrates the reacting of TAP with HKH to produce two isomers for use in COF formation.
Figure 18:
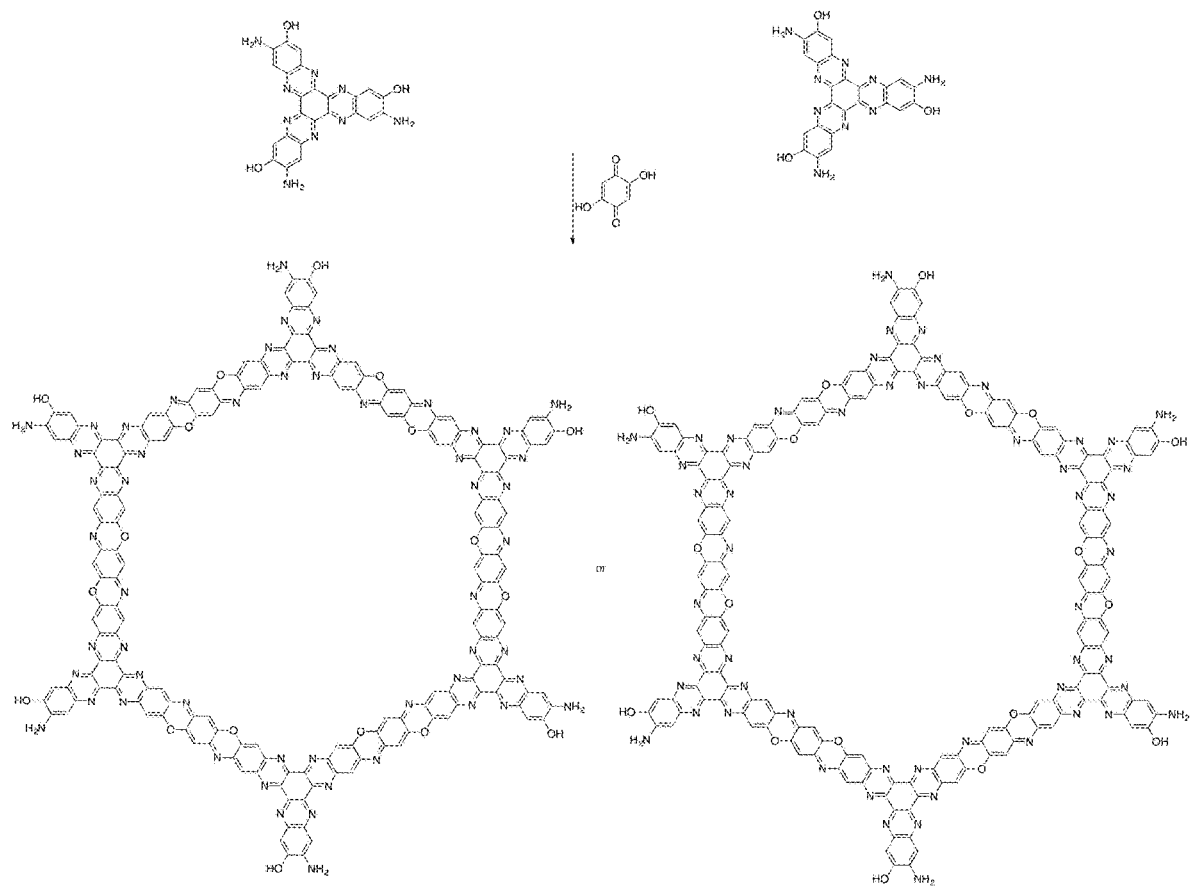
FIG. 18 illustrates an amino alcohol based COF in accordance with embodiments of the invention.

An inventive amino alcohol based COF is also provided as shown in FIG. 18. FIG. 16 illustrates a reaction for formation of TAPS. TAPS is a chemical compound commonly used to make buffer solutions. TAPS can bind divalent cations, including Co(II) and Ni(II). TAPS is effective to make buffer solutions in the pH range 7.7-9.1, since it has a $pK_a$ value of 8.44. FIG. 17 illustrates the reacting of TAP with HKH to produce two isomers for use in COF formation. As shown in FIG. 18 the COF forming reaction is based on the two isomers reacting with 2,5-dihydroxy-1,4-quinone.

In a specific inventive embodiment a positively charged Pd precursor, illustratively including Pd aquo 2+, is infused, and is bound by the carboxylates and is then reduced to Pd nanoparticles that will be stabilized by the multiple carboxylate groups in the pores of the COF and acts to prevent ripening of very small particles but still allowing rapid ingress and egress of hydrogen into the bulk of the material. This is a huge advantage over bulk Pd hydride but also may be an advantage for hydrogen separation. This is of value for hydrogen storage.

All filtration tests are performed at room temperature under a trans-membrane pressure of 1 bar, using a dead-end permeation cell with an effective membrane diameter of 1 cm.

Solvent permeance ($Lm^{-2}\ h^{-1}\ bar^{-1}$) and filtered species rejection (%) values are measured to evaluate the membrane separation performance. A solvent operative herein illustratively includes, water, any organic solvents compatible with a given membrane support, gases, and super critical carbon dioxide. It should be appreciated that the COF from which the layer is formed are exceptional stable under a variety of solvents and at elevated temperatures. Filtered species according to the present invention are also a broad class that includes molecules; ions; macromolecules, such as polypeptides, proteins, viruses, bacteria, nanocrystals, colloids, and combinations thereof with the proviso of being sized and/or charged relative to the pores of the two dimensional layer. By way of example, water permeance is calculated by Equation 1.

$$\text{Water permeance} = \frac{\Delta V}{\Delta t A_{eff} \Delta P} \quad \text{Equation 1}$$

where $\Delta V$ (L) is the volume of deionized water that has permeated through the membrane in a predetermined time $\Delta t$ (h), $A_{eff}$ is the effective membrane surface area (m²), $\Delta P$ is the trans-membrane pressure (bar).

Membrane selectivity is illustratively evaluated for a filterable species being the protein separation ability of membranes using 1000 ppm bovine serum albumen (BSA) protein in phosphate-buffered saline (PBS) solution as a feed. The protein rejection (%) is calculated by Equation 2.

$$\text{Rejection} = \left(1 - \frac{C_p}{C_r}\right) \times 100\% \quad \text{Equation 2}$$

where $C_p$ and $C_r$ are the BSA concentration in the permeate and retentate, respectively. BSA concentration is determined by a SpectraMax Plus 384 UV-Vis (Molecular Devices) from the absorption value at 280 nm.

Neutral solute separation is used to determine the pore size distribution, mean effective pore size ($\mu_p$), and molecular weight cut-off (MWCO) of membranes. An aqueous solution containing PEG (Mw=10,000 g mol⁻¹ and Mw=35,000 g mol⁻¹) and PEO (Mw=100,000 g mol⁻¹ and Mw=400,000 g mol⁻¹) at a concentration of 50 ppm each solute. The solute rejection is calculated using equation 4. The PEG/PEG concentrations in the permeate and retentate are analyzed by a gel permeation chromatography (GPC) system (Shimadzu) using a RID-20A refractive index detector. Based on the diameter of PEG/PEO and their rejection values, the mean effective pore size ($\mu_p$), pore size distribution and MWCO are determined by ignoring interactions between solutes and membrane pores. The mean effective pore size ($\mu_p$) and MWCO of the membrane is determined at the solute rejection of 50% and 90%, respectively. The pore size distribution of the membrane is conducted using the following probability density function based on Equation 3.

$$\frac{dR(d_p)}{dd_p} = \frac{1}{d_p \ln \sigma_p \sqrt{2\pi}} \exp\left[-\frac{(\ln d_p - \ln \mu_p)^2}{2(\ln \sigma_p)^2}\right] \quad \text{Equation 3}$$

where $\sigma_p$ is the geometric standard deviation defined as the ratio of pore diameter at 84.13% rejection over that at 50% rejection.

Accordingly, the present disclosure provides highly ordered 2D COF materials with tunable pores and demonstrated the synthesis of multiple pore functionalities. According to embodiments, a cation selective membrane with precise size-selectivity is provided. The synthetic flexibility of this system allows for rational design and synthesis of membrane materials for many different types of separations based on size, charge, hydrophobicity and hydrophilicity among others with potential applications in desalinization, non-protein fouling membranes, fuel cell membranes, redox flow battery membranes, dialysis membranes, gas separation membranes and other technologies requiring membrane separations, with some of them already being pursued in our laboratories.

The above experiments show similar permeance and selectivity for dye molecules of a variety of sizes and charges from aqueous solutions, as well as dyes from organic solutions such as tetrahydrofuran and toluene as a function of size or shape.

The present invention is further detailed with respect to the following drawings. These figures are not intended to limit the scope of the present invention but rather illustrate certain attributes thereof.

REFERENCES AND NOTES

1. C. S. Diercks, O. M. Yaghi, The atom, the molecule, and the covalent organic framework. *Science*. 355, eaal1585 (2017).
2. S. P. Surwade et al., Water desalination using nanoporous single-layer graphene. *Nature Nanotechnology*. 10, 459-464 (2015).
3. S. P. Koenig, L. Wang, J. Pellegrino, J. S. Bunch, Selective molecular sieving through porous graphene. *Nature Nanotechnology*. 7, 728-732 (2012).
4. R. C. Rollings, A. T. Kuan, J. A. Golovchenko, Ion selectivity of graphene nanopores. *Nature Commun*. 7, 11408 (2016).
5. D. R. Dreyer, S. Park, C. W. Bielawski, R. S. Ruoff, The chemistry of graphene oxide. *Chem. Soc. Rev*. 39, 228-240 (2010).
6. Y. Jiang, P. Biswas, J. D. Fortner, A review of recent developments in graphene-enabled membranes for water treatment. *Environ. Sci.: Water Res. Technol*. 2, 915-922 (2016).
7. C. Moreno et al., Bottom-up synthesis of multifunctional nanoporous graphene. *Science*, 199-203 (2018).
8. H. Xu, S. Tao, D. Jiang, Proton conduction in crystalline and porous covalent organic frameworks. *Nature Mat*. 15, 722-726 (2016).
9. E. Jin et al., Two-dimensional $sp^2$ carbon-conjugated covalent organic frameworks. *Science*. 357, 673-676 (2017).
10. D. S. Sholl, R. P. Lively, Seven chemical separations to change the world. *Nature*. 532, 435-437 (2016).
11. Joshi, R. K., Alwarappan, S., Yoshimura, M., Sahajwalla, V., & Nishina, Y. (2015). Graphene oxide: the new membrane material. *Applied Materials Today*, 1(1), 1-12.
12. Saedi, S.; Nikravesh, B.; Seidi, F.; Moradi, L.; Shamsabadi, A. A.; Salarabadi, M. B.; Salimi, H. Facilitated Transport of $CO_2$ through Novel Imidazole-Containing Chitosan Derivative/PES Membranes. *RSC Advances* 2015, 5 (82), 67299-67307. https://doi.org/10.1039/C5RA08303F.
13. Wang, S.; Liu, Y.; Zhang, M.; Shi, D.; Li, Y.; Peng, D.; He, G.; Wu, H.; Chen, J.; Jiang, Z. Comparison of Facilitated Transport Behavior and Separation Properties of Membranes with Imidazole Groups and Zinc Ions as CO2 Carriers. *J. Membr. Sci.* 2016, 505, 44-52. https://doi.org/10.1016/j.memsci.2016.01.016.
14. Lin, C.; Stedronsky, E. R.; Regen, S. L. PKa-Dependent Facilitated Transport of $CO_2$ across Hyperthin Polyelectrolyte Multilayers. *ACS Appl. Mater. Interfaces* 2017, 9 (23), 19525-19528. https://doi.org/10.1021/acsami.7b04473.
15. Du, Z.-T.; Lu, D.; Wu, J.; Huang, L.-Z.; Ma, B.-L.; Zhang, T. Microwave-Assisted Syntehsis of 2-Substituted 1H-Benzo[d]Imidazoles and Their Antifungal Activities in Vitro. *Heterocycles* 2013, 87 (7), 1545. https://doi.org/10.3987/COM-13-12734.
16. Kuehl, V. A.; Yin, J.; Duong, P. H. H.; Mastorovich, B.; Newell, B.; Li-Oakey, K. D.; Parkinson, B. A.; Hoberg, J. O. A Highly Ordered Nanoporous, Two-Dimensional Covalent Organic Framework with Modifiable Pores, and Its Application in Water Purification and Ion Sieving. *J. Am. Chem. Soc.* 2018, 140 (51), 18200-18207. https://doi.org/10.1021/jacs.8b11482.
17. "Ruthenium(III) Chloride Catalyzed Oxidation of Pyrene and 2,7-Disubstitued Pyrenes: An Efficient, One Step Synthesis of Pyrene-4,5-diones and Pyrene-4,5,9,10-tetraones" J. Hu, D. Zhang, and F. W. Harris *J. Org. Chem.* 2004, 70, 2005.
18. "Synthesis, structure elucidation and DFT studies of a new coumarin-derived Zn(II) complex: in vitro DNA/HSA binding profile and pBR322 cleavage pathway." Ruchi Singh, Mohd. Afzal, Mehvash Zaki, Musheer Ahmad, Sartaj Tabassum and Parimal K. Bharadwaj *RSC Advances* 2014, 4, 43504.
19. Open Journal of Synthesis Theory and Applications, 2014, 3, 15-20

The invention claimed is:

1. A composition of matter, comprising:
a two-dimensional covalent organic imidazole framework polymer having an aromatic backbone and ordered nanometer sized pores, the two-dimensional covalent organic imidazole framework polymer represented by (a) or (b):

(a)

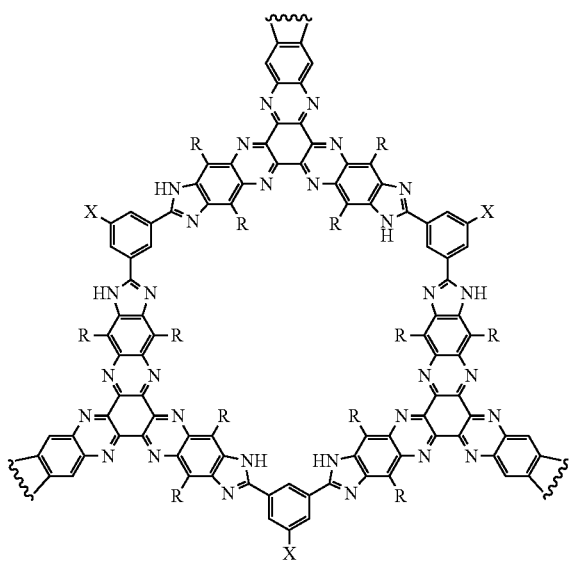

or (b)

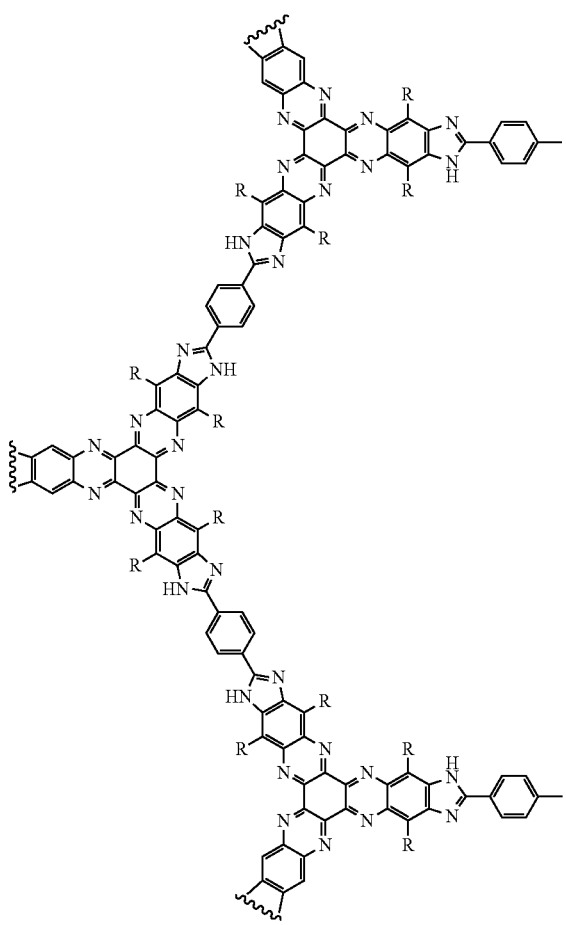

-continued

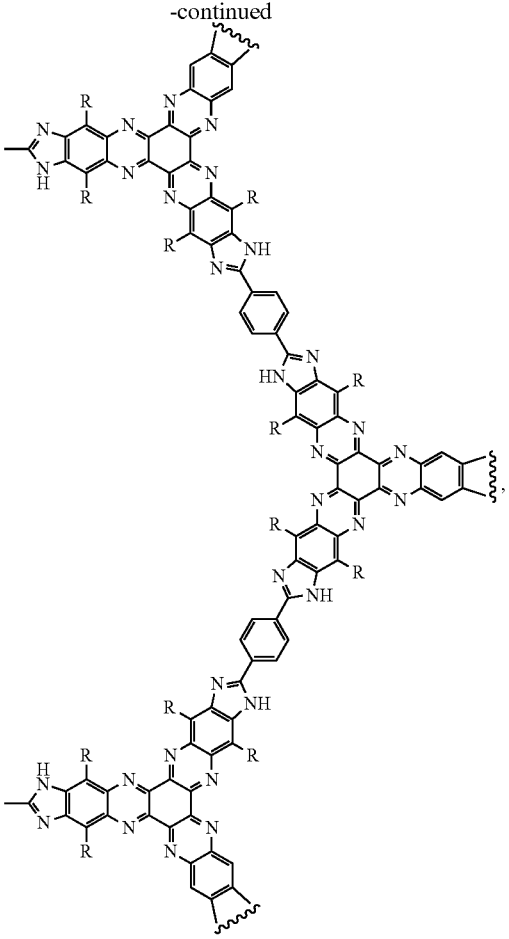

wherein:
each R of (a) and (b) independently comprises hydrogen, halogen, amine, nitrile, hydroxyl, carboxyl, peptide, ammonium, onium, alkane, alkene, silane, sulfonyl, or phosphate;
each X of (a) and (b) independently comprises nitrile, carboxylic acid, or connection to another pore of the two-dimensional covalent organic imidazole framework polymer; and
the wavy bonds of (a) and (b) represent a connection to another pore of the two-dimensional covalent organic imidazole framework polymer.

2. The composition of claim 1, wherein the aromatic backbone is photoactive.

3. The composition of claim 1, wherein the aromatic backbone is semi-conducting.

4. The composition of claim 1, wherein the pores are 2.8 nm in diameter.

5. The composition of claim 1, wherein each R of (a) and (b) independently comprises sulfonyl.

6. A filtration membrane formed of the composition of claim 1.

7. The filtration membrane of claim 6, wherein the filtration membrane has a filtered species rejection of at least 60% per single membrane pass.

8. The filtration membrane of claim 6, wherein the filtration membrane has a filtered species rejection of up to 95% per single membrane pass.

9. The filtration membrane of claim 6, wherein the filtration membrane has a solvent permeance value of more than 900 $Lm^{-2}h^{-1}bar^{-1}$.

10. The filtration membrane of claim 6, wherein the filtration membrane has a solvent permeance value of up to 6000 $Lm^{-2}h^{-1}bar^{-1}$.

11. The filtration membrane of claim 6, wherein the filtration membrane has atomic scale capillaries.

12. The filtration membrane of claim 6, comprising a hydrophilic layer and a hydrophobic layer.

13. The filtration membrane of claim 12, wherein the hydrophilic layer is formed of carboxylated covalent organic imidazole framework polymer.

14. The filtration membrane of claim 12, wherein the hydrophobic layer is formed of tertiary amine lined covalent organic imidazole framework polymer.

15. The filtration membrane of claim 6, further comprising an anodic aluminum oxide (AAO) substrate.

16. A method of forming the filtration membrane of claim 6, the method comprising:

providing a substrate; and depositing carboxyl covalent organic imidazole framework polymer onto the substrate.

17. The method of claim 16, wherein the substrate is anodic aluminum oxide (AAO).

18. The method of claim 16, wherein the covalent organic imidazole framework polymer is exfoliated covalent organic imidazole framework polymer.

19. The method of claim 16, wherein the covalent organic imidazole framework polymer is deposited onto the substrate under vacuum.

20. The method of claim 16, further comprising applying exfoliated tertiary amine covalent organic imidazole framework polymer and exfoliated carboxyl covalent organic imidazole framework polymer in alternating layers as a stack on the AAO substrate.

* * * * *